United States Patent
Nguyen et al.

(10) Patent No.: US 12,088,176 B2
(45) Date of Patent: Sep. 10, 2024

(54) DYNAMICALLY RECONFIGURABLE POWER CONVERTER UTILIZING WINDINGS OF ELECTRIC MACHINE

(71) Applicant: EXRO TECHNOLOGIES INC., Calgary (CA)

(72) Inventors: Tung Nguyen, Calgary (CA); Eric Hustedt, Calgary (CA); Joshua Eric Sobil, Calgary (CA)

(73) Assignee: EXRO TECHNOLOGIES INC., Calgary (CA)

( * ) Notice: Subject to any disclaimer, the term of this patent is extended or adjusted under 35 U.S.C. 154(b) by 251 days.

(21) Appl. No.: 17/860,798

(22) Filed: Jul. 8, 2022

(65) Prior Publication Data

US 2023/0011977 A1 Jan. 12, 2023

Related U.S. Application Data

(60) Provisional application No. 63/219,730, filed on Jul. 8, 2021.

(51) Int. Cl.
| | |
|---|---|
| *H02K 5/22* | (2006.01) |
| *H02K 7/00* | (2006.01) |
| *H02K 11/33* | (2016.01) |

(52) U.S. Cl.
CPC .............. *H02K 5/225* (2013.01); *H02K 7/006* (2013.01); *H02K 11/33* (2016.01)

(58) Field of Classification Search
CPC ......... H02K 5/225; H02K 7/006; H02K 11/33
See application file for complete search history.

(56) References Cited

U.S. PATENT DOCUMENTS

| | | |
|---|---|---|
| 4,313,080 A | 1/1982 | Park |
| 4,562,398 A | 12/1985 | Kotlarewsky |

(Continued)

FOREIGN PATENT DOCUMENTS

| | | |
|---|---|---|
| CN | 107683554 A | 2/2018 |
| DE | 102006033629 A1 | 1/2008 |

(Continued)

OTHER PUBLICATIONS

Babaei, et a;, "New cascaded multilevel inverter topology with minimum number of switches", Energy Conversion and Management 50 (2009) 2761-2767, 7 pages.

(Continued)

*Primary Examiner* — Tulsidas C Patel
*Assistant Examiner* — Mohammed Ahmed Qureshi
(74) *Attorney, Agent, or Firm* — Cozen O'Connor

(57) ABSTRACT

A dynamically-reconfigurable power converter includes a controller circuit and switching circuitry. The switching circuitry includes a first set of nodes electrically connectable to terminals of an energy storage device, a second set of nodes electrically connectable to at least one winding of a rotational electric machine, and a third set of nodes electrically connectable to an external power source. Electrical measurement circuitry monitors electrical conditions at the first set of nodes and the third set of nodes. The switching circuitry is operative in a first mode to regulate power delivery from the first set of nodes to the second set of nodes, and in a second mode to regulate power delivery between the third set of nodes and the first set of nodes via the second set of nodes.

27 Claims, 10 Drawing Sheets

(56) References Cited

U.S. PATENT DOCUMENTS

| | | |
|---|---|---|
| 4,593,289 A | 6/1986 | Newcomb |
| 5,270,635 A | 12/1993 | Hoffman et al. |
| 5,418,436 A | 5/1995 | Apuzzo |
| 5,656,915 A | 8/1997 | Eaves |
| 5,670,861 A | 9/1997 | Nor |
| 5,747,964 A | 5/1998 | Turnbull |
| 5,773,962 A | 6/1998 | Nor |
| 5,850,351 A | 12/1998 | Lotfy et al. |
| 6,121,752 A | 9/2000 | Kitahara et al. |
| 6,265,846 B1 | 7/2001 | Flechsig et al. |
| 6,420,852 B1 | 7/2002 | Sato |
| 6,531,848 B1 | 3/2003 | Chitsazan et al. |
| 6,707,272 B1 | 3/2004 | Thandiwe |
| 7,126,312 B2 | 10/2006 | Moore |
| 7,176,654 B2 | 2/2007 | Meyer et al. |
| 7,193,391 B2 | 3/2007 | Moore |
| 7,391,180 B2 | 6/2008 | Armiroli et al. |
| 7,525,285 B2 | 4/2009 | Plett |
| 7,816,805 B2 | 10/2010 | Tanaka et al. |
| 8,120,321 B2 | 2/2012 | Vezzini et al. |
| 8,247,105 B2 | 8/2012 | Liu |
| 8,278,858 B2 | 10/2012 | Fang et al. |
| 8,288,992 B2 | 10/2012 | Kramer et al. |
| 8,310,198 B2 | 11/2012 | Kurimoto et al. |
| 8,330,419 B2 | 12/2012 | Kim et al. |
| 8,368,357 B2 | 2/2013 | Ghantous et al. |
| 8,426,063 B2 | 4/2013 | Lin |
| 8,427,105 B2 | 4/2013 | Plett |
| 8,427,106 B2 | 4/2013 | Kim et al. |
| 8,427,112 B2 | 4/2013 | Ghantous et al. |
| 8,470,464 B2 | 6/2013 | Troutman |
| 8,513,921 B2 | 8/2013 | Berkowitz et al. |
| 8,564,247 B2 | 10/2013 | Hintz et al. |
| 8,577,529 B2 | 11/2013 | Takahashi et al. |
| 8,614,563 B2 | 12/2013 | Baughman |
| 8,685,563 B1 | 4/2014 | Lin |
| 8,729,861 B2 | 5/2014 | Nishida et al. |
| 8,796,993 B2 | 8/2014 | White et al. |
| 8,798,832 B2 | 8/2014 | Kawahara et al. |
| 8,928,282 B2 | 1/2015 | Kudo et al. |
| 8,988,045 B2 | 3/2015 | Klein et al. |
| 9,018,898 B2 | 4/2015 | Ziv et al. |
| 9,024,586 B2 | 5/2015 | Vance et al. |
| 9,054,533 B2 | 6/2015 | Gaul et al. |
| 9,093,864 B2 | 7/2015 | Abe et al. |
| 9,121,910 B2 | 9/2015 | Maluf et al. |
| 9,130,377 B2 | 9/2015 | Barsukov et al. |
| 9,147,910 B2 | 9/2015 | Chuah et al. |
| 9,153,845 B2 | 10/2015 | Tanaka et al. |
| 9,197,081 B2 | 11/2015 | Finberg et al. |
| 9,365,120 B2 | 6/2016 | Timmons et al. |
| 9,379,552 B2 | 6/2016 | Ritchey et al. |
| 9,395,420 B2 | 7/2016 | White et al. |
| 9,450,274 B2 | 9/2016 | Vo et al. |
| 9,496,727 B2 | 11/2016 | Liu et al. |
| 9,520,613 B2 | 12/2016 | Brockerhoff |
| 9,564,763 B2 | 2/2017 | Finberg et al. |
| 9,579,961 B2 | 2/2017 | Harris |
| 9,669,726 B2 | 6/2017 | Luo et al. |
| 9,705,340 B2 | 7/2017 | Lucea |
| 9,787,107 B2 | 10/2017 | Lutze et al. |
| 9,800,193 B2 * | 10/2017 | Mao ................ H02P 25/20 |
| 9,885,757 B2 | 2/2018 | Liu et al. |
| 9,902,277 B2 | 2/2018 | Keller et al. |
| 9,948,116 B2 | 4/2018 | Matsumoto et al. |
| 9,960,611 B2 | 5/2018 | Toya |
| 9,979,211 B2 | 5/2018 | Barsukov et al. |
| 10,044,069 B2 | 8/2018 | Despesse |
| 10,069,313 B2 | 9/2018 | Tkachenko et al. |
| 10,073,128 B2 | 9/2018 | Yoshioka et al. |
| 10,074,997 B2 | 9/2018 | Vo et al. |
| 10,093,191 B2 | 10/2018 | Keller et al. |
| 10,147,983 B2 | 12/2018 | Kawahara et al. |
| 10,222,428 B2 | 3/2019 | Saint-Marcoux et al. |
| 10,232,716 B2 | 3/2019 | Higuchi et al. |
| 10,256,643 B2 | 4/2019 | Toya |
| 10,263,435 B2 | 4/2019 | Kim et al. |
| 10,270,263 B2 | 4/2019 | Brozek |
| 10,277,041 B2 | 4/2019 | Zane et al. |
| 10,298,026 B2 | 5/2019 | Trimboli et al. |
| 10,305,298 B2 | 5/2019 | Kristensen |
| 10,305,409 B2 | 5/2019 | Wang et al. |
| 10,330,732 B2 | 6/2019 | Roumi et al. |
| 10,416,236 B2 | 9/2019 | Uchino et al. |
| 10,483,791 B2 | 11/2019 | Mergener et al. |
| 10,543,303 B2 | 1/2020 | Zilbershlag et al. |
| 10,561,775 B2 | 2/2020 | Zilbershlag |
| 10,615,610 B1 | 4/2020 | Jelinek |
| 10,644,537 B2 | 5/2020 | Krishnan et al. |
| 10,778,014 B2 | 9/2020 | Barsukov et al. |
| 10,833,512 B2 | 11/2020 | Remboski et al. |
| 10,910,846 B2 | 2/2021 | Jelinek |
| 10,958,075 B2 | 3/2021 | Collins et al. |
| 10,958,083 B2 | 3/2021 | Halsey |
| 10,985,552 B2 | 4/2021 | Tada et al. |
| 10,985,587 B2 | 4/2021 | Matsumura et al. |
| 10,992,144 B2 | 4/2021 | Li et al. |
| 10,992,145 B2 | 4/2021 | Wang et al. |
| 10,992,146 B2 | 4/2021 | Flowers et al. |
| 11,005,276 B2 | 5/2021 | Lee et al. |
| 11,095,148 B2 | 8/2021 | Mergener et al. |
| 11,128,153 B1 | 9/2021 | Cho et al. |
| 11,133,680 B2 | 9/2021 | Wang et al. |
| 11,171,494 B2 | 11/2021 | Tang et al. |
| 11,277,012 B2 | 3/2022 | Ono et al. |
| 11,336,104 B2 | 5/2022 | Poland et al. |
| 11,777,329 B2 | 10/2023 | Osswald et al. |
| 2002/0070707 A1 | 6/2002 | Sato |
| 2005/0024015 A1 | 2/2005 | Houldsworth et al. |
| 2005/0052155 A1 | 3/2005 | Surig |
| 2005/0156574 A1 | 7/2005 | Sato et al. |
| 2005/0212487 A1 | 9/2005 | Sodeno |
| 2005/0269989 A1 | 12/2005 | Geren et al. |
| 2006/0022639 A1 | 2/2006 | Moore |
| 2006/0022676 A1 | 2/2006 | Uesaka et al. |
| 2006/0033475 A1 | 2/2006 | Moore |
| 2006/0055377 A1 | 3/2006 | Okubo et al. |
| 2006/0092583 A1 | 5/2006 | Alahmad et al. |
| 2006/0097698 A1 | 5/2006 | Plett |
| 2007/0008669 A1 | 1/2007 | Al-Haddad |
| 2007/0276547 A1 | 11/2007 | Miller |
| 2008/0116847 A1 | 5/2008 | Loke et al. |
| 2009/0027006 A1 | 1/2009 | Vezzini et al. |
| 2009/0066291 A1 | 3/2009 | Tien et al. |
| 2009/0078481 A1 | 3/2009 | Harris |
| 2009/0079397 A1 | 3/2009 | Ibrahim |
| 2009/0167247 A1 | 7/2009 | Bai et al. |
| 2009/0208837 A1 | 8/2009 | Lin |
| 2009/0251100 A1 | 10/2009 | Incledon et al. |
| 2010/0207580 A1 | 8/2010 | Nishida et al. |
| 2010/0244781 A1 | 9/2010 | Kramer et al. |
| 2010/0244847 A1 | 9/2010 | Kudo et al. |
| 2010/0259219 A1 | 10/2010 | Yokomizo et al. |
| 2010/0261043 A1 | 10/2010 | Kim et al. |
| 2010/0261048 A1 | 10/2010 | Kim et al. |
| 2010/0305792 A1 | 12/2010 | Wilk et al. |
| 2011/0057617 A1 | 3/2011 | Finberg et al. |
| 2011/0078470 A1 | 3/2011 | Wang et al. |
| 2011/0089897 A1 | 4/2011 | Zhang et al. |
| 2011/0127960 A1 | 6/2011 | Plett |
| 2011/0169454 A1 | 7/2011 | Maruyama et al. |
| 2011/0260687 A1 | 10/2011 | Kudo et al. |
| 2012/0013304 A1 | 1/2012 | Murase et al. |
| 2012/0065824 A1 | 3/2012 | Takahashi et al. |
| 2012/0074898 A1 | 3/2012 | Schwartz |
| 2012/0091964 A1 | 4/2012 | Vance et al. |
| 2012/0094150 A1 | 4/2012 | Troutman |
| 2012/0112688 A1 | 5/2012 | Ho |
| 2012/0206105 A1 | 8/2012 | Nishizawa et al. |
| 2012/0239214 A1 | 9/2012 | Nakashima et al. |
| 2012/0256592 A1 | 10/2012 | Baughman |
| 2012/0274331 A1 | 11/2012 | Liu et al. |
| 2012/0319493 A1 | 12/2012 | Kim et al. |
| 2013/0002182 A1 | 1/2013 | Bates et al. |

(56) References Cited

U.S. PATENT DOCUMENTS

| | | |
|---|---|---|
| 2013/0002183 A1 | 1/2013 | Bates et al. |
| 2013/0002201 A1 | 1/2013 | Bodkin et al. |
| 2013/0009595 A1 | 1/2013 | Brown |
| 2013/0020979 A1 | 1/2013 | Bates et al. |
| 2013/0026989 A1 | 1/2013 | Gibbs et al. |
| 2013/0026993 A1 | 1/2013 | Hintz et al. |
| 2013/0033231 A1 | 2/2013 | Zhang |
| 2013/0065093 A1 | 3/2013 | White et al. |
| 2013/0069598 A1 | 3/2013 | Tanaka et al. |
| 2013/0169234 A1 | 7/2013 | Chuah et al. |
| 2013/0175954 A1 | 7/2013 | Astigarraga et al. |
| 2013/0175966 A1 | 7/2013 | Astigarraga et al. |
| 2013/0207599 A1 | 8/2013 | Ziv et al. |
| 2013/0257382 A1 | 10/2013 | Field et al. |
| 2014/0015488 A1 | 1/2014 | Despesse |
| 2014/0021924 A1 | 1/2014 | Abe et al. |
| 2014/0077752 A1 | 3/2014 | Barsukov et al. |
| 2014/0103850 A1 | 4/2014 | Frank |
| 2014/0145684 A1 | 5/2014 | Liu et al. |
| 2014/0167780 A1 | 6/2014 | White et al. |
| 2014/0265994 A1* | 9/2014 | Mao .................. H02K 17/14 318/773 |
| 2014/0287278 A1 | 9/2014 | Despesse |
| 2014/0292283 A1 | 10/2014 | Timmons et al. |
| 2014/0312828 A1 | 10/2014 | Vo et al. |
| 2014/0327407 A1 | 11/2014 | Lucea |
| 2014/0361743 A1 | 12/2014 | Lin et al. |
| 2014/0363881 A1 | 12/2014 | Caiafa et al. |
| 2014/0368168 A1 | 12/2014 | Beckman |
| 2015/0028817 A1 | 1/2015 | Brockerhoff |
| 2015/0102779 A1 | 4/2015 | Schumacher et al. |
| 2015/0219721 A1 | 8/2015 | Yang et al. |
| 2015/0231985 A1 | 8/2015 | Li |
| 2015/0244313 A1 | 8/2015 | Mcnamara et al. |
| 2015/0280466 A1 | 10/2015 | Owen et al. |
| 2015/0380959 A1 | 12/2015 | Chang et al. |
| 2016/0043579 A1 | 2/2016 | Finberg et al. |
| 2016/0072316 A1 | 3/2016 | Barsukov et al. |
| 2016/0089994 A1 | 3/2016 | Keller et al. |
| 2016/0111900 A1 | 4/2016 | Beaston et al. |
| 2016/0190830 A1 | 6/2016 | Kuhlmann et al. |
| 2016/0241054 A1 | 8/2016 | Matsumoto et al. |
| 2016/0254683 A1 | 9/2016 | Matsumoto et al. |
| 2016/0336764 A1 | 11/2016 | Becker et al. |
| 2016/0336765 A1 | 11/2016 | Trimboli et al. |
| 2016/0336767 A1 | 11/2016 | Zane et al. |
| 2016/0351976 A1 | 12/2016 | Kawahara et al. |
| 2017/0016961 A1 | 1/2017 | Lucea |
| 2017/0054306 A1 | 2/2017 | Vo et al. |
| 2017/0104347 A1 | 4/2017 | Shimonishi et al. |
| 2017/0146609 A1 | 5/2017 | Uchino et al. |
| 2017/0214253 A1 | 7/2017 | Kim et al. |
| 2017/0264110 A1 | 9/2017 | Toya |
| 2017/0271893 A1 | 9/2017 | Brozek |
| 2017/0299660 A1 | 10/2017 | Saint-Marcoux et al. |
| 2017/0346334 A1 | 11/2017 | Mergener et al. |
| 2018/0008760 A1 | 1/2018 | Zilbershlag et al. |
| 2018/0056798 A1 | 3/2018 | Syouda |
| 2018/0062402 A1 | 3/2018 | Syouda |
| 2018/0123357 A1 | 5/2018 | Beaston et al. |
| 2018/0134168 A1 | 5/2018 | Keller et al. |
| 2018/0145520 A1 | 5/2018 | Sasaki et al. |
| 2018/0183298 A1 | 6/2018 | Severson |
| 2018/0219390 A1 | 8/2018 | Tkachenko et al. |
| 2018/0226810 A1 | 8/2018 | Barsukov et al. |
| 2018/0241227 A1 | 8/2018 | Halsey |
| 2018/0301929 A1 | 10/2018 | Krishnan et al. |
| 2018/0337536 A1 | 11/2018 | Li et al. |
| 2018/0339093 A1 | 11/2018 | Zilbershlag |
| 2018/0366959 A1 | 12/2018 | Coenen |
| 2019/0103750 A1 | 4/2019 | Kristensen |
| 2019/0115849 A1 | 4/2019 | Götz |
| 2019/0148952 A1 | 5/2019 | Remboski et al. |
| 2019/0229540 A1 | 7/2019 | Lee et al. |
| 2019/0273380 A1 | 9/2019 | Collins et al. |
| 2019/0280488 A1 | 9/2019 | Tang et al. |
| 2019/0288526 A1 | 9/2019 | Jaensch et al. |
| 2019/0299799 A1 | 10/2019 | Hinterberger et al. |
| 2019/0334354 A1 | 10/2019 | Mizukami et al. |
| 2019/0393696 A1 | 12/2019 | Tada et al. |
| 2020/0036047 A1 | 1/2020 | Aikens et al. |
| 2020/0044459 A1 | 2/2020 | Lee et al. |
| 2020/0052524 A1 | 2/2020 | Mergener et al. |
| 2020/0099110 A1 | 3/2020 | Lin |
| 2020/0122580 A1 | 4/2020 | Zou et al. |
| 2020/0144952 A1 | 5/2020 | Mao et al. |
| 2020/0203961 A1 | 6/2020 | Flowers et al. |
| 2020/0220364 A1 | 7/2020 | Wang et al. |
| 2020/0244076 A1 | 7/2020 | Wang et al. |
| 2020/0274203 A1 | 8/2020 | Kirleis et al. |
| 2020/0274368 A1 | 8/2020 | Crouse |
| 2020/0274371 A1 | 8/2020 | Kirleis et al. |
| 2020/0274386 A1 | 8/2020 | Kirleis et al. |
| 2020/0321788 A1 | 10/2020 | Ono et al. |
| 2020/0373801 A1 | 11/2020 | Kinjo et al. |
| 2020/0381925 A1 | 12/2020 | Jelinek |
| 2020/0403420 A1 | 12/2020 | Nagase et al. |
| 2020/0412159 A1 | 12/2020 | Snyder et al. |
| 2021/0044119 A1 | 2/2021 | Poland et al. |
| 2021/0075230 A1 | 3/2021 | Ono et al. |
| 2021/0083506 A1 | 3/2021 | Rao et al. |
| 2021/0098996 A1 | 4/2021 | Ono et al. |
| 2021/0098998 A1 | 4/2021 | Eo |
| 2021/0135489 A1 | 5/2021 | Stites-Clayton et al. |
| 2021/0234380 A1 | 7/2021 | Ono et al. |
| 2021/0249873 A1 | 8/2021 | Despesse et al. |
| 2021/0257947 A1 | 8/2021 | Kinjo et al. |
| 2021/0257949 A1 | 8/2021 | Mcdonald et al. |
| 2021/0273461 A1 | 9/2021 | Lin et al. |
| 2021/0296912 A1 | 9/2021 | Cho et al. |
| 2021/0302505 A1 | 9/2021 | Worry et al. |
| 2021/0313830 A1 | 10/2021 | Dowler et al. |
| 2021/0408856 A1 | 12/2021 | Fukunaga |
| 2022/0060029 A1 | 2/2022 | Syouda et al. |
| 2022/0216728 A1 | 7/2022 | Ashman et al. |
| 2022/0407334 A1 | 12/2022 | Kouda et al. |

FOREIGN PATENT DOCUMENTS

| | | |
|---|---|---|
| EP | 3360795 A1 | 8/2018 |
| JP | 3481037 B2 | 12/2003 |
| JP | 2009080093 A | 4/2009 |
| JP | 2013247003 A | 12/2013 |
| KR | 102066323 B1 | 1/2020 |
| SE | 9701662 | 6/1998 |
| WO | 9848290 A1 | 10/1998 |
| WO | 2017219136 A1 | 12/2017 |
| WO | 2020047663 A1 | 3/2020 |
| WO | 2021001046 A1 | 1/2021 |

OTHER PUBLICATIONS

Final Office Action for U.S. Appl. No. 17/727,143, mailed Feb. 16, 2023, 26 pages.
Horsche et al., "Realising Serial Hybrid Energy Storage Systems (sHESS) by implementing Switching Circuits on Battery Cell Level", EVS29 Symposium, Montreal Quebec, Canada, Jun. 19-22, 2016.
International Search Report and Written Opinion for PCT/CA2022/000039, mailed Nov. 23, 2022, 12 pages.
International Search Report and Written Opinion mailed Jul. 12, 2022 in PCT/CA2022/050620, 15 pages.
International Search Report and Written Opinion mailed Aug. 15, 2022 in PCT/CA2022/050753.
International Search Report and Written Opinion mailed Sep. 21, 2022 in PCT/CA2022/050620, 17 pages.
Non Final Office Action for U.S. Appl. No. 17/727,143, mailed Aug. 22, 2022, 28 pages.
Non Final Office Action for U.S. Appl. No. 17/842,217, mailed Aug. 8, 2022, 25 pages.
Non-Final Office Action Issued in U.S. Appl. No. 17/727,143, mailed Jun. 9, 2023, 28 pages.

(56) References Cited

OTHER PUBLICATIONS

Non-Final Office Action Issued in U.S. Appl. No. 17/742,727, mailed Aug. 2, 2023, 9 pages.
Notice of Allowance for U.S. Appl. No. 17/605,354, mailed Mar. 20, 2023, 12 pages.
Notice of Allowance for U.S. Appl. No. 17/727,143, mailed Sep. 20, 2023.
Notice of Allowance for U.S. Appl. No. 17/842,217, mailed Apr. 12, 2023, 10 pages.
Speltino, et al., "Cell Equalization in Battery Stacks Through State of Charge Estimation Polling", 2010 American Control Conference Marriott Waterfront, Baltimore, MD, USA Jun. 30-Jul. 2, 2010, 6 pages.
Welsh, "A Comparison of Active and Passive Cell Balancing Techniques for Series/Parallel Battery Packs" Thesis, Electrical and Computer Engineering Graduate Program, The Ohio State University, 2009, 115 pages.
Zhang, et al., "A harmonic injection method for improving NVH performance permanent magnet synchronous motor", Journal of Physics: Conference Series, 1802 (2021) 032132, 6 pages.
Non Final Office Action for U.S. Appl. No. 17/274,038, mailed Feb. 9, 2024, 15 pages.
Non-Final Office Action Issued in U.S. Appl. No. 17/274,036, mailed Dec. 21, 2023, 15 pages.

\* cited by examiner

DYNAMICALLY RECONFIGURABLE POWER CONVERTER UTILIZING WINDINGS OF ELECTRIC MACHINE

PRIOR APPLICATION

This application claims the benefit of U.S. Provisional Application Ser. No. 63/219,730 filed Jul. 8, 2021, and entitled "VARIABLE COIL CONFIGURATION SYSTEM, APPARATUS AND METHOD, EMPLOYABLE AS A GRID TIE CONVERTER," the disclosure of which is incorporated by reference herein.

TECHNOLOGICAL FIELD

This application generally relates to electrical power systems and, more particularly, to power converters and associated methodology utilizing inductive windings of an electric machine as indictors of switching regulators.

BACKGROUND

Advances in battery and semiconductor-manufacturing technologies in recent years, along with the promulgation of government policies to encourage investment in the generation and utilization of alternative energy sources, have led to widespread adoption of technologies such as electric vehicles (EVs), and electrical power generation from renewable sources, including photovoltaic (PV) arrays to capture solar energy, wind-turbine generators, and the like.

These technologies may interact with the electrical power grid in various ways. In the case of EVs, which include plug-in-hybrid, as well as full-electric cars and trucks, the traction batteries of EVs may be conventionally charged from the power grid. Traction batteries of different EVs have correspondingly different voltages, typically in the range of 350-800 V. Hence, charging of traction batteries involves converting the power grid voltage from the alternating-current (AC) voltage to a suitable DC voltage for charging the traction battery using power-converter circuitry.

In addition to consuming power from the power grid for charging, traction batteries may also be used to supply power to the grid. For instance, when EVs are sitting idle for some time, their stored energy may be resold and transferred back to the grid, such as during times of peak electricity demand when the resale price can exceed the original cost of charging the EV batteries. In the case of renewable power generation, the generated power may be applied to a load which is locally coupled to the generator, and any excess generated power may be sold and transferred to the grid.

Coupling of disparate power systems for purposes of transferring power from one to another is not trivial. Power may be generated at different voltages, depending on the conditions surrounding its generation. Some power sources are direct-current (DC) sources, while others may be alternating-current (AC) sources. The power grid uses certain standard AC voltages, and power generators on the grid are synchronized to the AC waveform. Hence, a power source interfaced with the grid should have a suitable voltage relative to the grid to effect power transfer in the desired amount, and the power produced or provided by the power source should have an AC waveform, the phase of which matched to the waveform of the grid. Conventionally, a power converter may be used to increase or decrease a power source's provided voltage in a controlled fashion that accounts for variability of the power source to produce a stable voltage. For DC power sources, an inverter circuit may be used to generate an AC waveform that matches the frequency and phase angle of the grid.

Power converter and inverter circuitry oftentimes use one or more inductors to store energy, filter to smooth out switched-mode power conversion, and to boost the output voltage, as may be needed, e.g., in a boost-converter configuration. For high-power applications, such inductor(s) are large, heavy, and expensive components that typically have a coil of wire, a core made from a magnetic material such as a ferrous material, and magnetic shielding which is also made from a ferrous material. Electric machines, such as motors and generators, have inductive windings. It has been proposed to make use of such windings as inductors of power converters. See, for example, U.S. Pat. No. 8,198,845 to Knoedgen, the disclosure of which is incorporated by reference herein.

While the secondary use of motor windings as inductors in power-converter circuits offers certain advantages, it is not without its challenges. For instance, one such challenge is that the currents in the motor's stator windings from the power-conversion circuit cause magnetic fields that interact with the rotor, in turn causing torsional vibration of the rotor shaft.

Solutions are needed to address this, and other, challenges to achieve practical and efficient implementations of secondary use of motor windings as inductors.

BRIEF SUMMARY

The present application relates to power converters, for example grid tie power converters that can charge DC power storage devices (e.g., secondary battery cells; super- or ultra-capacitor cells) directly from AC power from a grid and/or delivery AC power to the grid from DC power storage devices. The power converters include electrical measurement circuitry, switching circuitry, controller circuitry, and at least one rotational electric machine. The rotational electric machine can, for example, take the form of an electric generator or electric motor.

A power converter according to aspects of this application advantageously employs the windings of the rotational electric machine(s) as inductors of the power converter, for example, to invert or rectify the current and/or to adjust voltages. The controller circuitry is operative to switch the electrical configuration of the windings to modify the circuit topology in real time or almost real time, for instance, after deployment of the system to a site of use and/or under load. Electrical measurement circuitry can, for example, include voltage probes coupled to sense AC or DC voltage on input or output nodes, current sensors coupled to sense electrical current flowing from and to the inputs and outputs, or a combination of such probes. The systems and methods can, for example, advantageously employ Field Oriented Control (FOC) to control operation of the electric machine.

One aspect of the embodiments described herein is a dynamically-reconfigurable power converter, comprising: a controller circuit; switching circuitry comprising plurality of switches operatively coupled to the controller circuit. The switching circuitry further includes a first set of nodes electrically connectable to terminals of an energy storage device, and a second set of nodes electrically connectable to at least one winding of a rotational electric machine. Also, a third set of nodes are electrically connectable to an external power source.

Electrical measurement circuitry (e.g., voltage or current probes) are operatively coupled to the controller circuit and arranged to monitor time-varying electrical conditions at the first set of nodes and the third set of nodes. The plurality of switches, including a first subset of switches, are operative in a first mode, under control of the controller circuit, to regulate power delivery from the first set of nodes to the second set of nodes such that, in operation, power from the power storage device is delivered to the at least one winding of the rotational electric machine to run the rotational electric machine. In addition, the plurality of switches, including the first subset of switches, are operative in a second mode, under control of the controller circuit based on the electrical conditions at the first set of nodes and the third set of nodes, to regulate power delivery between the third set of nodes and the first set of nodes via the second set of nodes such that, in operation, power is converted and delivered between the external power source and the energy storage device through the at least one winding that is employed as an inductor.

In a related aspect, is a method for electrically configuring an electric vehicle (EV) in various modes includes configuring, by a controller of the EV, switching circuitry of the EV to operate in a motor driver mode to transfer power from a traction battery of the EV to a traction motor of the EV. Operation of the switching circuitry in the motor driver mode includes, activating a first subset of switches to implement an inverter that energizes windings of the traction motor with alternating current (AC) so as to impart rotation of a rotor of the traction motor.

Further, the method includes reconfiguring, by the controller, the switching circuitry to operate in a charging mode to transfer power from an external power source to the traction battery of the EV. Operation of the switching circuitry in the charging mode includes activating the first subset of switches to implement a switching power converter that utilizes the windings of the traction motor as inductors, and that converts voltage of the external power source to a DC voltage of a controlled magnitude to regulate the power transfer to the traction battery. Pairs of the windings associated with each phase of the traction motor are energized simultaneously in opposite polarities to negate a net effect of such energization of those windings on movement of the rotor of the traction motor.

The described technology is operative with the electric machine operating either an electric motor or electric generator, or both, for example, in applications such as regenerative braking or charging in an electric vehicle, in which the windings of the electric machine can be employed as inductors of various power converter architectures or topologies.

Another advantage is the ability to employ the windings of the electric machine, in various configurable electrical arrangements, as inductors in a power converter which can, for example, charge a DC power storage device (e.g., secondary battery cells; ultra- or super-capacitor cells) from various power sources (e.g., AC grid power, DC power from a photovoltaic array) and/or deliver power from a DC power storage device to a various loads (e.g., exporting stored power to an AC grid). The described technology changes the underlying paradigm by altering the electromagnetics of the electric machine in response to changes in speed and, or torque, or alternatively in response to measured voltages to operate as part of a power converter to store power to or release power from one or more DC power storage devices (e.g., traction motor secondary batteries, super- or ultra-capacitors, and even fuel cells via consumption of hydrogen).

The dynamically configured electric machine can function as though the windings were used in multiple different power converter architectures (e.g., buck converter, boost converter, inverter, rectifier), for example based on whether power is to be stored to one or more DC power storage devices (e.g., during times of relatively low demand on an AC grid) or delivered from one or more DC power storage devices (e.g., during times of relatively high demand on an AC grid). Power can be provided to an AC grid or other load, for example during times of relatively high demand on the AC grid or as backup power.

The apparatus and methods described herein may be utilized in many forms providing benefits for electric power generation, electric motor drive applications, and full four quadrant operations used for applications such as electric vehicles. In some implementations, traction motor secondary batteries (i.e., secondary battery that supplied power to traction motor(s) of an electric vehicle) of one or more electric vehicles (i.e., fully electric vehicles, hybrid electric vehicles) can be used as power storage devices). Power from an AC grid can stored to the batteries of the electric vehicles, for example when demand for power is typically low. The stored power may be used to propel the vehicle or it may be returned to the grid, or supplied directly to some other load during times when demand for power is higher or even at peak demand times. Fleets of electric vehicles may be used as gird tied power storage devices importing and export electric power based on demand when not in use as a transportation device.

The dynamically-reconfigurable multi-modal power converter system as described in this disclosure can advantageously operate as a "universal" power converter, for example to charge one or more DC power storage devices (e.g., secondary battery cell, traction motor secondary battery cells, super- or ultra-capacitor cells) from various DC or AC power sources.

In addition, the system can be used as a grid tie converter to charge one or more DC power storage devices directly from an AC electrical grid and/or deliver AC power to an AC electrical grid from the one or more DC power storage devices. Alternatively or additionally, the system can accept a DC input, for example from photovoltaic (PV) arrays or panels and/or deliver DC power to DC electrical systems.

The system can include electrical measurement circuitry coupled to measure AC voltages at three (3) AC nodes (e.g., nodes coupled to an AC electrical grid). A controller (e.g., micro-controller, microprocessor, field programmable gate array, application specific integrated circuit) can execute logic to implement the grid tie aspect. For example, the controller can implement a phased locked loop (PLL) to detect grid frequency and deliver corresponding angles to a field oriented control (FOC) already implemented in a motor controller to allow grid tie current control and/or output voltage control, for instance in case of a stand-alone AC power source.

In the case of DC power sources such as solar or photovoltaic panels or arrays, the controller can implement a maximum power point tracking (MPPT) algorithm to maximize the electrical power generation of the solar or photovoltaic panels or arrays.

The use the windings of an electric machine (e.g., electric motor) as the energy storage component of a power converter to facilitate charging a traction motor battery may present issues related to the reaction of the rotor of the electric machine to the asynchronous 50/60 Hz AC stator current. Any electric vehicle is typically stationary during charging (other than charging in regenerative mode), therefore the electric machine is typically not turning when charging. However, at least in the case of permanent-magnet electric machines, the magnets are still energized, which results in torsional vibration on a shaft (e.g., motor shaft) of the electric machine as it responds to the rotating 50/60 Hz field in the stator. The systems and methods described herein can advantageously address such effect, reducing or even eliminating the shaft torsional vibration.

The systems and methods described herein advantageously provide switching circuitry and operation thereof to operate as a motor drive to provide full 4 quadrant traction motor control while an electric vehicle is mobile (in transit), and when the electric vehicle is stationary the same power electronics package can advantageously be used to charge the DC power storage device (e.g., traction motor battery) from various AC power sources and/or DC power sources, additionally due to the bi directional nature of the converter it can also be used to deliver power to the AC grid or DC power systems.

BRIEF DESCRIPTION OF THE DRAWINGS

In the drawings, identical reference numbers identify similar elements or acts. The sizes and relative positions of elements in the drawings are not necessarily drawn to scale. Further, the particular shapes of the elements as drawn are not intended to convey any information regarding the actual shape of the particular elements, and have been solely selected for ease of recognition in the drawings. The various embodiments are illustrated by way of example and not by way of limitation in the accompanying Figures.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electric machines (e.g., generators, motors), control systems, and/or power conversion systems (e.g., converters, inverters, rectifiers) have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
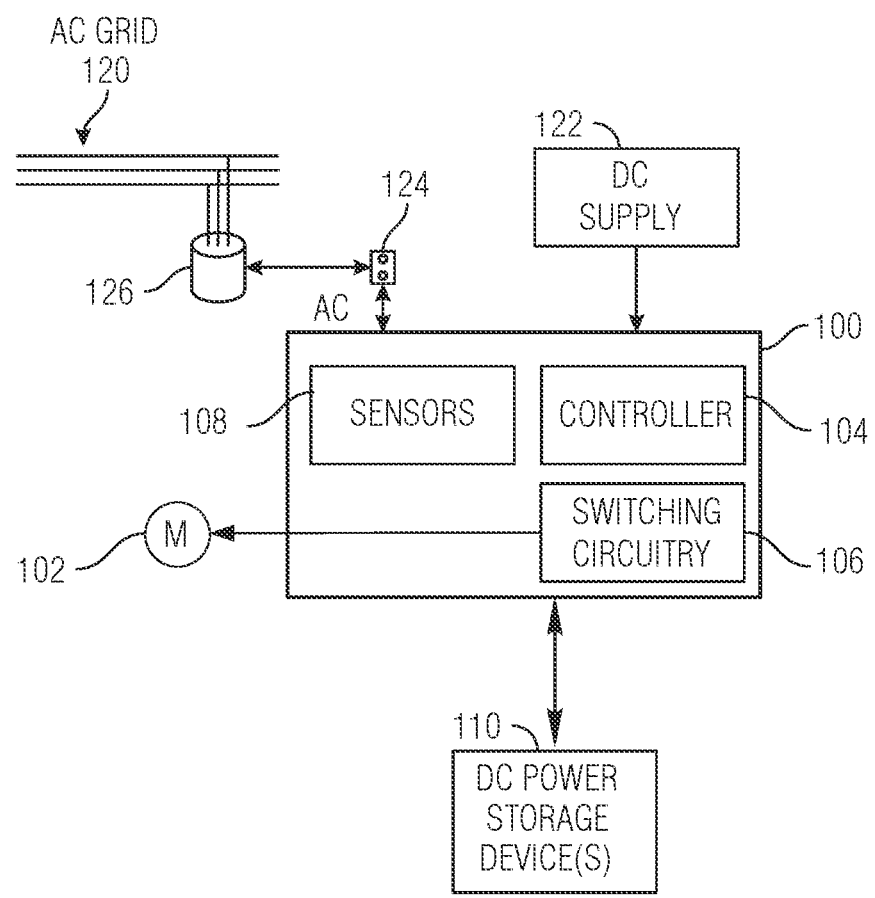
FIG. 1 is a schematic diagram illustrating a dynamically-reconfigurable multi-modal power converter system according to some embodiments.

FIG. 1 is a schematic diagram illustrating a dynamically-reconfigurable multi-modal power converter system 100 according to some embodiments. System 100 utilizes an electric machine M 102 in various ways, based on the configuration of system 100. In one type of configuration, system 100 is operative as a driver of electric machine 102. In other configurations, system 100 utilizes the windings of electric machine 102 as inductors in power-converter circuitry.

Electric machine 102 may be a poly-phase electrical machine, for example, a non-commutated (AC) machine, such as an induction motor, synchronous motor (e.g., permanent-magnet or field-excited rotor), or brushless DC motor, or electrical generator, with sufficiently constructed windings to withstand the operating voltages and currents as may be required by operation of the power-converter circuitry.

System 100 includes controller 104, switching circuitry 106, and electrical probes 108. In various applications, as described in greater detail below, system 100 may be electrically coupled to DC power storage device(s) 110. The one or more DC power storage devices 110 can take a variety of forms, for example traction motor secondary battery cells of an electric vehicle, other secondary battery cells, super- or ultra-capacitor cells, and even regenerative fuel cells where hydrogen can be generated and stored. DC power storage device(s) 110 may be used to supply power to, and recover power from, electric machine 102 when electric machine 102 is used as a motor in 4-quadrant operation that includes regenerative braking.

Switching circuitry 106, operating under the control of controller 104, may produce variable-frequency drive power to electric machine 102, and may rectify and convert power generated by electric machine 102 to a DC voltage to recharge DC power storage device(s) 110. Switching circuitry 106 includes a plurality of controlled switches (for example semiconductors) which may be electronically arranged by controller 104 to provide motor-drive functionality, rectification functionality, inversion functionality, voltage boost-functionality, and voltage-reduction functionality. Notably, certain individual switches may be configured to perform different ones of these functions at different times. Switching circuitry 106 may also include supporting circuitry, such as gate-driving circuits, snubbing circuits, filters, protection components, controller-interface circuitry, and the like.

In addition, system 100 may be operatively coupled to one or more additional sources of power, such as an AC power grid 120, DC supply 122 (e.g., a photovoltaic array, fuel cell, or other DC source). Switching circuitry 106, operating under the control of controller 104, may additionally convert power from either, AC grid 120, or DC supply 122, to recharge DC power storage device(s) 110. Moreover, switching circuitry 106, operating under the control of controller 104, may further convert power from DC storage device(s) 110 to be supplied to either AC grid 120, or DC supply 122. Such power conversions may involve rectification, inversion, voltage boosting, or voltage reduction.

The electric machine 102 can, for example, take the form of an electric machine of an electric vehicle (e.g., plug-in fully electric vehicle or plug-in hybrid electric vehicle) that during operation of the electric vehicle acts as a traction motor and/or a regenerative braking generator to charge a traction motor battery of the electric vehicle.

The AC power grid 120 can take the form of any conventional AC power grid, and may supply electric power to an electric power node or receptacle 124 of a household, recharging station, or commercial facility via one or more transformers 126 at suitable voltages (e.g., 120 V, 220 V, 240 V, or 277 V single phase, or 208 V, 380 V, 400 V or 480 V three phase).

Controller 104 may take a variety of forms according to various embodiments. For example, controller 104 may take the form of a microcontroller, microprocessor, application specific integrated circuit or programmable gate array. Controller 104 is operative to coordinate and adjust operation of system 100, providing a memory, an instruction processor, analog-to-digital (A/D) conversion, digital input and output (I/O), timing functions, as well as data communications. Instructions executable by controller 104 may be provided as firmware stored in a non-volatile data store such as a flash electrically-erasable read-only memory (EEPROM), or other at least one suitable non-transitory storage medium.

In some embodiments, controller 104 may be interfaced with a user interface (UI) (not shown). The UI may be implemented via a dedicated local operator interface (LOI) device that may include a display or electronic indicators, and at least one input device, such as one or more pushbutton, knob, wheel, touchscreen, or the like. In other embodiments, the UI of controller 104 may be implemented using a UI of the EV. In this example, the UI of the EV may be communicatively coupled to a serial-communications interface of controller 104 via a communication bus of the EV, such as an inter-integrated circuit ($I^2C$) bus, controller area network (CAN) bus, or the like. In other examples, the UI may be implemented via a communicatively-coupled computing device, such as a smartphone, tablet, personal computer (PC), or the like, which may communicate directly with controller 104 via a personal-area network (PAN) such as an IEEE 802.15.1 network, commonly referred to as Bluetooth or Bluetooth Low Energy (BLE), or indirectly, such as over the Internet through a Web-based server or cloud-based Internet-of-things (IOT) service.

Electrical probes 108 are arranged at the electric power node 124 or input of DC supply 122. Electrical probes 108 may be implemented using a voltage-probe circuit, such as a high-stability voltage divider circuit across each node, or a current-probe circuit, such as a high-stability shunt resistor in series with the current path to be measured. The probe circuits are coupled to an A/D converter to be sampled and quantized, and ultimately interfaced with controller 104, which may be programmed to periodically read the voltage output of each voltage-probe circuit or current-probe circuit on a sampling basis. Controller 104 may compute the voltage of each respective measured node, and in the case of AC voltage, controller 104 may computationally determine the AC wave's frequency and phase information, based on zero crossing or PLL or similar.

Figure 2:
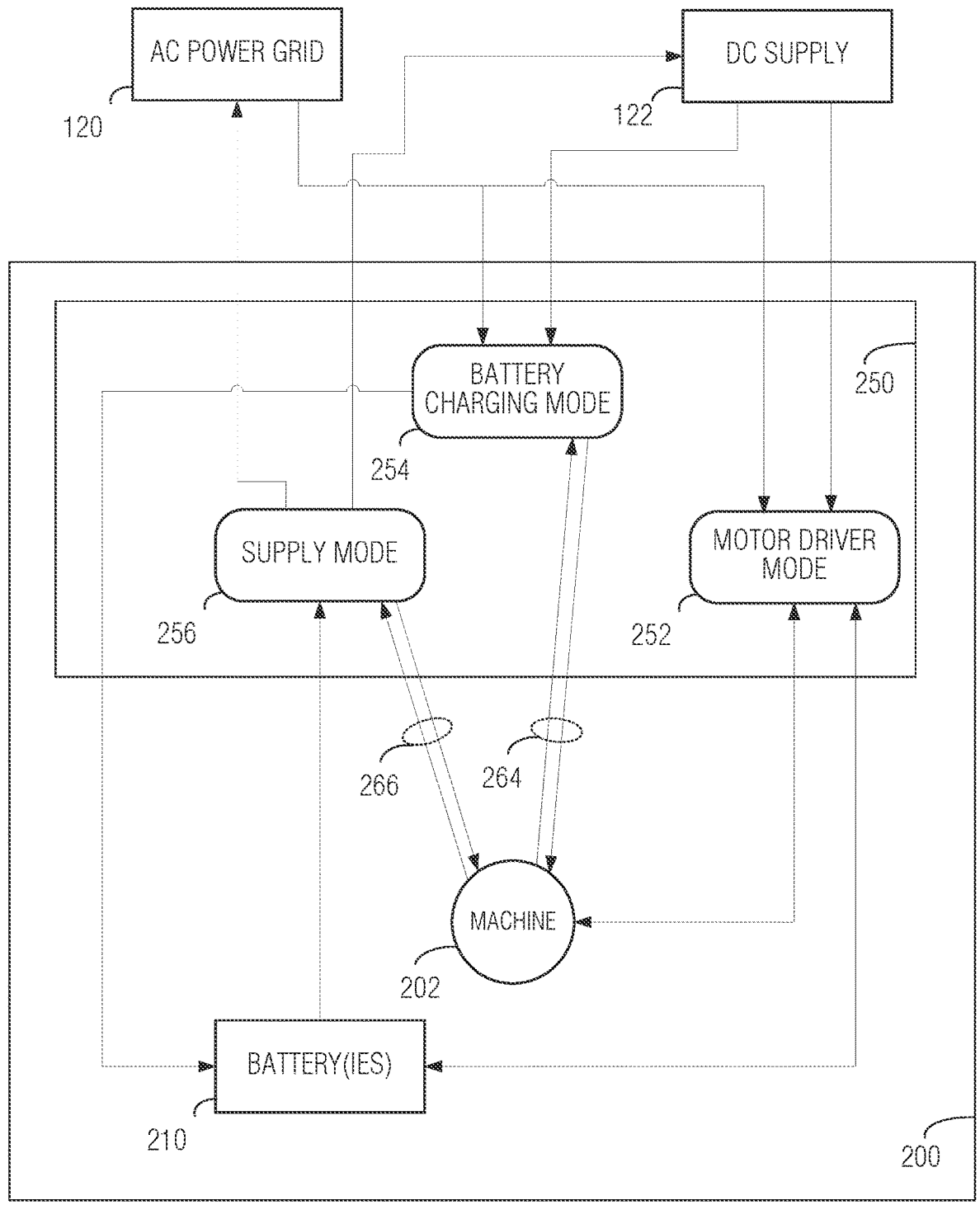
FIG. 2 is a block diagram illustrating various modes of operation of an electromechanical system, which are facilitated by a dynamically-reconfigurable power converter system such as the system of FIG. 1, according to some embodiments.

Controller 104 may use the measured electrical information and, in some embodiments, user input, to configure and control switching circuitry 106 in order to achieve the called-for power-transfer functionality. FIG. 2 is a block diagram illustrating various modes of operation of electromechanical system 200, which are facilitated by a dynamically-reconfigurable power converter system such as system 100, according to some embodiments. Electromechanical system 200 includes an electric machine 202 which has machine windings, and one or more batteries 210. Electromechanical system 200 further includes a multi-modal power converter system 250, which is an example of system 100, and includes a controller (such as controller 104), electrical measurement circuitry (such as probes 108), and switching circuitry (such as switching circuitry 106)—which are not separately shown for clarity.

Electromechanical system 200 may be part of an EV, or it may be a different type of system which uses a motor/generator and energy store. Examples of the latter include a battery-backed motorized system, such as a commercial or industrial heating, ventilation and air-conditioning (HVAC) system, an elevator or escalator system, a pumping station, such as a sump pump, lifting station of a water system, a pumped-storage hydropower station, or the like.

As depicted, system 250 implements a controller program which may be realized via firmware instructions executed on the hardware of the controller, such as controller 104. The controller program includes motor driver mode 252, battery charging mode 254, and supply mode 256. Motor driver mode 252 is operative to run electric machine 202 from battery(ies) 210. In stationary-system embodiments (e.g., pumping stations), electric machine 202 may be powered primarily from AC power grid 120 or from DC supply 122 and, secondarily, from battery(ies) 210 as backup. Motor driver mode 252 may implement an inverter, such as an H-bridge circuit, variable-frequency drive, field-oriented control (FOC), or other suitable motor-driving technique. In embodiments, that implement regenerative braking, motor driver mode 252 is operative to feed power from machine 202 back to battery(ies) 210, which may include converting the power generated by the rotating machine 202 into a suitable DC voltage for charging battery(ies) 210.

Battery charging mode 254 operates the switching circuitry as a power converter to produce DC power for charging battery(ies) 210. The switching circuitry may receive input power from AC power grid 120 (or a grid-independent AC source), or DC supply 122. Accordingly, the input voltage may vary considerably, and call for different voltage-regulation techniques (e.g., boost, buck, etc.) for which the switching circuitry of system 250 may be dynamically configured. Notably, in battery-charging mode, system 250 utilizes the windings of machine 202 as one or more inductors, as indicated at 264.

Supply mode 256 is operative to transfer power from battery(ies) 210 to AC power grid 120 or DC supply 122 (for instance, where DC supply 122 includes a DC bus that may power other equipment). In supply mode 256, the switching circuitry of system 250 may perform inversion to generate an AC wave, and voltage conversion (boosting or reduction), and utilize the windings of machine 202 as one or more inductors, as indicated at 266. For supplying power to AC power grid 120, voltage measuring of the grid voltage is used by the controller of system 250 to synchronize the generated waveform of the inverter output with the phase of the AC power grid 120. By way of example, the controller may implement a phase-locked-loop (PLL)-based control scheme to track the phase of the AC waveform. Voltage or current measurement may be used to control the amount of the power transfer.

Notably, in some embodiments, each of these modes of operation is carried out at different times, but using the same switching circuitry 106 such that certain switches may implement different modes of operation at different times in corresponding different circuit topologies. For instance, in motor driver mode 252, a given switch of switching circuitry 106 may be a leg of an H-bridge motor-driving topology; whereas in battery charging mode 254, the same switch may operate as a switching regulator of a boost converter.

Figure 3:
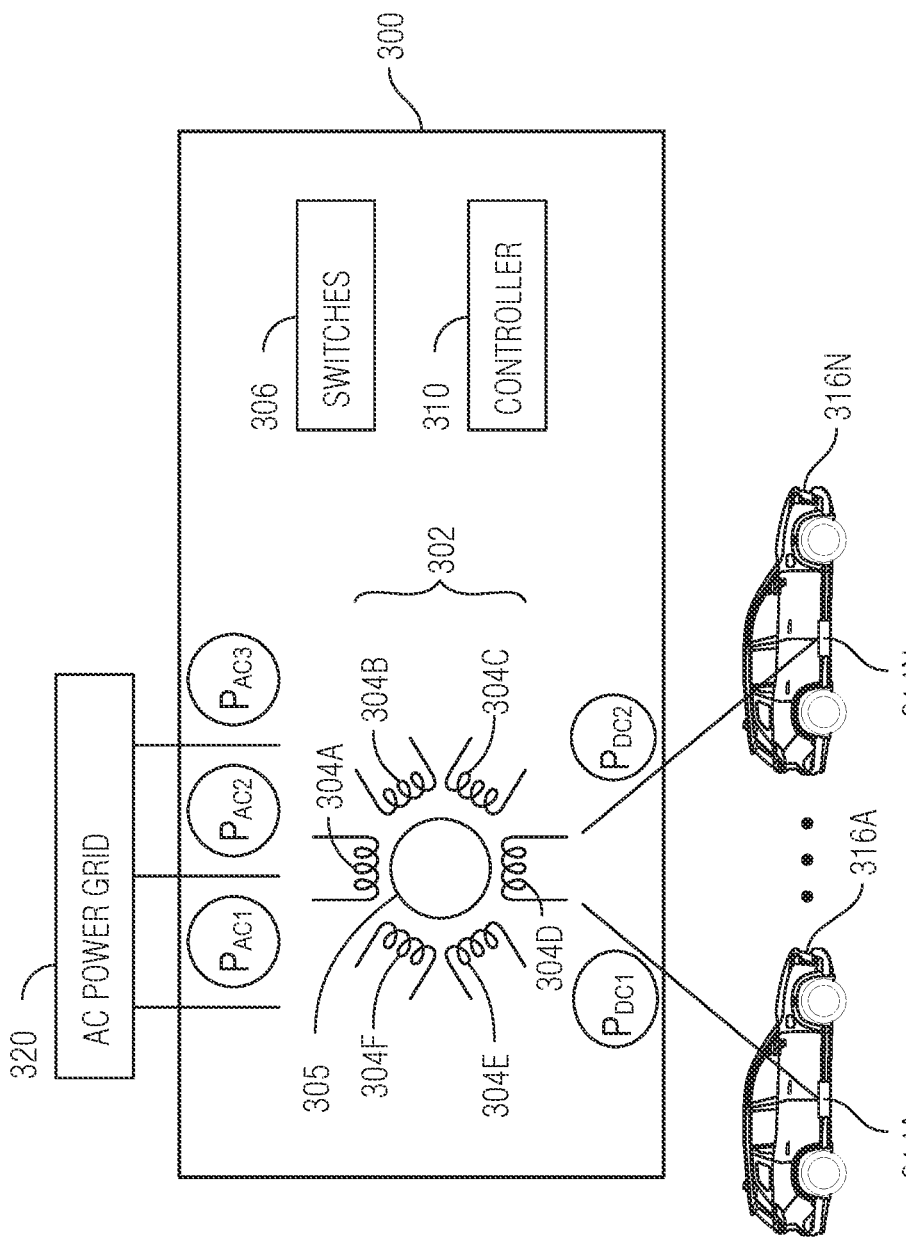
FIG. 3 is a schematic diagram illustrating a grid-tie arrangement according to a type of embodiment, in which one, or a group of electrical storage devices may be charged from an AC power grid, and, separately, used to supply power to the AC power grid.

FIG. 3 is a schematic diagram illustrating a grid-tie arrangement according to a type of embodiment, in which one, or a group of electrical storage devices may be charged from an AC power grid, and, separately, used to supply power to the AC power grid. As depicted, system 300 comprises a three-phase electric machine 302 with three pairs of windings 304a, 304b, 304c, 304d, 304e, 304f, and a rotor 305. The electric machine 302 may be a traction motor of an EV, or other type of motor or generator.

System 300 further includes switching circuitry 306 similar to switching circuitry 106 (FIG. 1), and a controller 310 similar to controller 104 (FIG. 1) that executes switching logic according to at least battery-charging mode 254 and supply mode 256 (FIG. 2). System 300 also includes a plurality of electrical probes, for example a first set of AC voltage probes $P_{AC1}$, $P_{AC2}$, $P_{AC3}$, and a first set of DC voltage probes $P_{DC1}$, $P_{DC2}$ (only two shown) which are communicatively coupled to the controller 310 to provide signals representative of the measured voltages. While not illustrated in FIG. 3, the system 300 can employ other sensors, for examples sensors to positioned or coupled to sense the operational aspects (e.g., rotational speed, rotational position of the rotor, temperature) of the electric machine 302 or components thereof.

The system 300 is electrically coupled to an AC power grid 320, which may be available via a single-phase mains power tap, or a three-phase supply, as shown. The system 300 is also electrically coupleable to one or more DC power storage devices, for instance, a number of traction motor secondary batteries 314a, 314n (only two shown) of one or more EVs 316a, 316n (only two shown) which may be part of a fleet of electric vehicles 316a, 316n. In other applications, the DC power storage device(s) may be a battery control system (BCS) as described, for example, in U.S. patent application Ser. No. 13/842,213 entitled "Battery Control Systems and Methods," the disclosure of which is incorporated by reference herein.

Notably, system 300 may be incorporated in one of the EVs 316. Accordingly, system 300 may be arranged in one embodiment such that only the secondary battery 314 that is onboard a given EV is chargeable using system 300. In other embodiments, system 300 may charge a plurality of secondary batteries 314, including batteries of other EVs, using system 300 that is incorporated in one of the EVs of the group. In other embodiments, system 300 is not incorporated in one of EVs 316; instead, system 300 is a stand-alone system associated with an electric machine 302 which is not a motor of any EV 316.

The controller 310 of the system 300 is operative to control the switches 306 to operate, at least during a first period, as a power converter according to battery charging mode 254 to receive AC power from the AC power grid 320 and to output DC power of an appropriate voltage for the DC power storage devices (e.g., traction motor secondary batteries 314a, 314n) or BCS. The controller 310 of the system 300 is operative according to supply mode 256 to control the switches 306 to operate, at least during a second period, as a power converter to receive DC power from the DC power storage devices (e.g., traction motor secondary batteries 314a, 314n or BCS) and output AC power (single or three-phase) to the AC power grid 320 at an appropriate voltage and in-phase with the AC power grid. In particular, the controller 310 can open and close (turn ON and OFF) various switches to couple selected windings 304a-304f of the electric machine 302 as inductors of one or more power converter architectures.

For most electric machine types there are numerous control methods that may be employed and most are appropriate for the disclosed switching control system, including frequency/voltage—f/V ratio control systems, 6 step inverters, pulse width modulated (PWM) inverters, Space Vector, Field Oriented Control (FOC), etc. Many of these designs have options that may play a role in determining the best way to integrate the technology given certain circumstances and desired outcomes. As an example, the FOC systems may be sensorless, or may use encoders, Hall effect sensors, or other components with feedback loops to assist in the control of the system. While the technology may be applied to many electric machine designs, in at least one implementation of the technology into a Permanent Magnet Synchronous Machine (PMSM) using a Field Oriented Control topology with a phase locked loop based in input from a set of AC voltage probes.

Figure 4A:
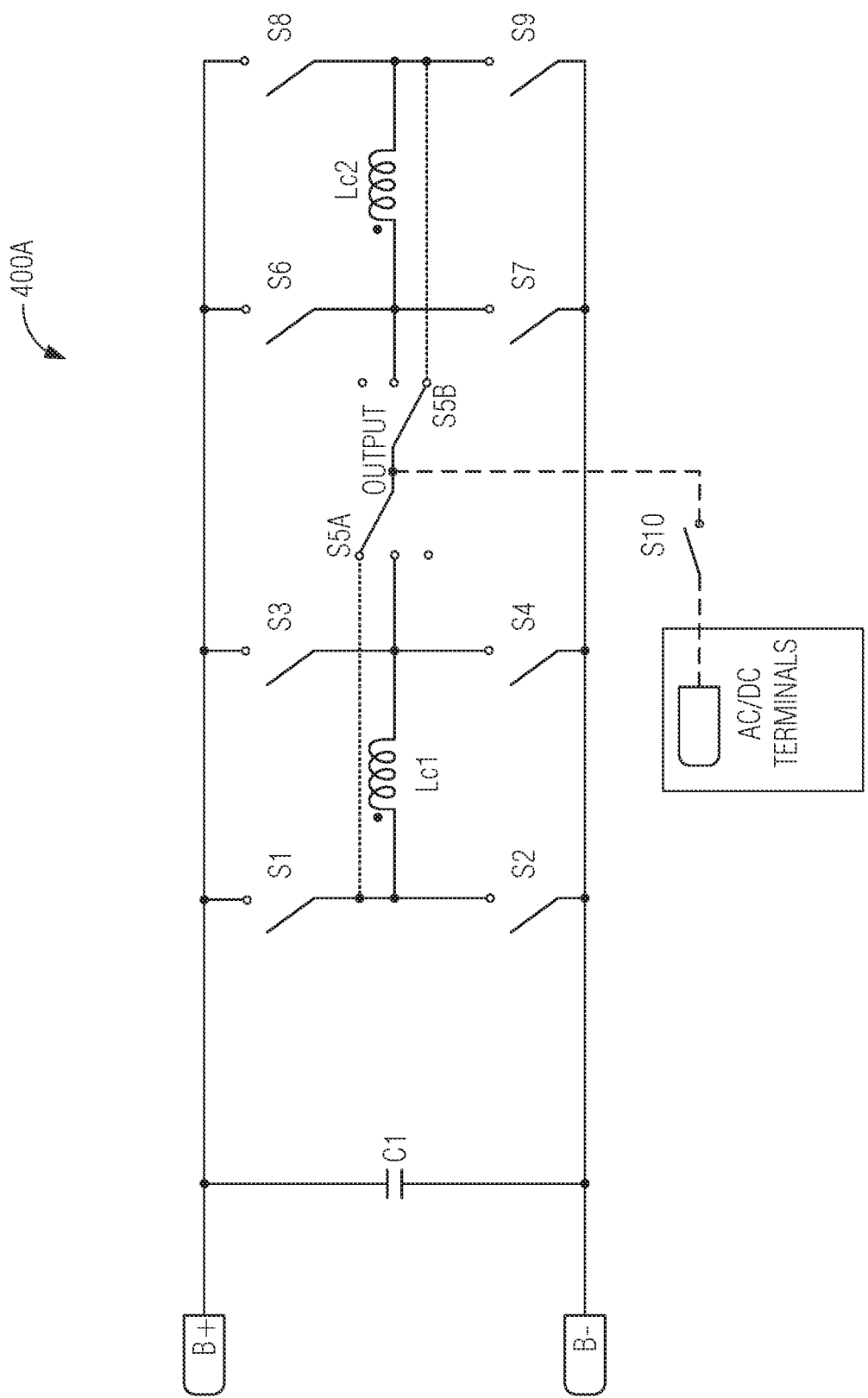
FIG. 4A is a circuit diagram illustrating switching circuitry that is an example of a portion of the switching circuitry of the systems of FIG. 1 or FIG. 3, according to some embodiments.

FIG. 4A is a circuit diagram illustrating switching circuitry 400A, which is an example of a portion of switching circuitry 104 or 306 according to an example embodiment. As shown, switching circuitry 400A corresponds to one phase of a multi-phase electric machine. Switching circuitry 400A, comprising switches S1-S9, and filter capacitor C1, may be duplicated for each phase of the electric machine.

Figure 5:
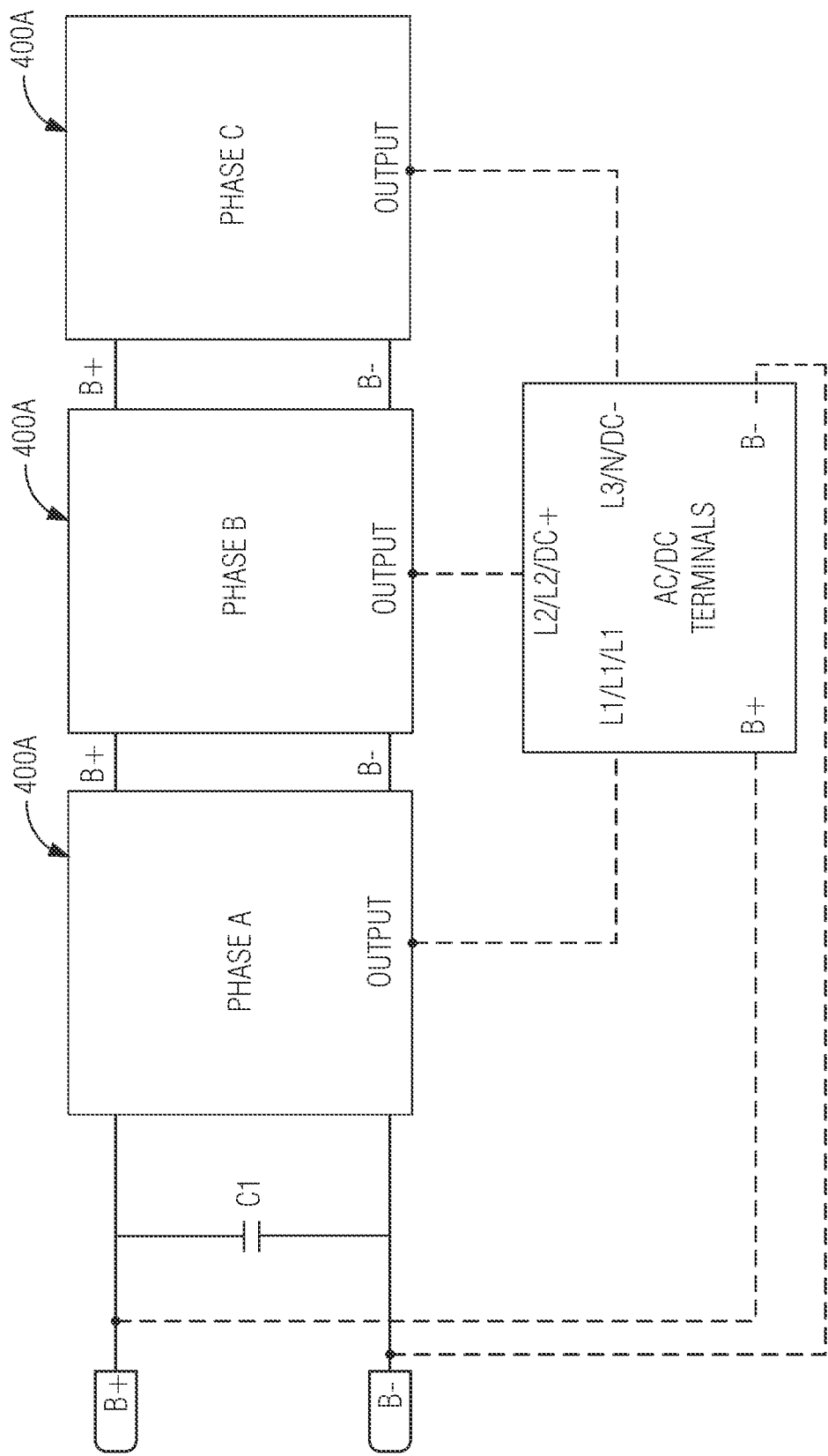
FIG. 5 is a block diagram illustrating a multi-phase arrangement of multiple instances of switching circuitry, such as the switching circuitry of FIG. 4A, in relation to a panel of AC/DC terminals according to some embodiments.

For example, FIG. 5 is a block diagram illustrating a multi-phase arrangement of multiple instances of switching circuitry 400A, indicated as PHASE A, PHASE B, and PHASE C, in relation to a panel of AC/DC terminals. As shown, the OUTPUT node of each phase, A, B, and C, is connected to the panel of AC/DC terminals, where multiple connections are implemented to facilitate multiple configurations of the power converter as follows. For example:

In case of a 3 phase AC grid or load, lines L1, L2 and L3 are connected to the OUTPUT node of 3 phases A, B, C accordingly.

In case of AC split phase, lines L1, L2, and neutral (N) are connected to the OUTPUT node of 3 phases A, B, C in the same manner.

A DC source or load is connected to DC+ and DC− or B− while another input (AC or DC) is connected to L1 and DC−.

Referring again to FIG. 4A, each of switches S1-S9 is a suitable semiconductor type switch (which may include one or multiple semiconductor devices), such as a triode for alternating current (triac), insulated gate bipolar transistor (IGBT), field effect transistor (FET), solid state relay (SSR), or other suitable technology, which is sufficiently robust to support the voltages and currents of the application, and withstand transient spikes. Larger power-transistor-based switches may include supporting electronics, such as gate driving circuitry, snubbing circuitry, or the like, which are not shown for the sake of clarity.

Terminals B+ and B− respectively correspond to the positive and negative terminals of the energy storage device, such as a traction battery of an EV. Inductors Lc1 and Lc2 are realized as a pair of windings of one phase of the electric machine.

Switches S5A-S5B are operative to connect and disconnect the OUTPUT node to the H-bridge circuits constructed by S1-S4 and S6-S9. The OUTPUT node connects switching circuitry 400A to the either AC power grid 120 or DC supply 122 through disconnect switch S10 and AC/DC terminals as shown. The AC/DC terminals may be provided as part of a AC/DC terminal panel.

In a related embodiment, switches S5A and S5B facilitate polarity reversal of each winding Lc1 and Lc2 with respect to the AC or DC terminals, as shown with dotted lines.

In motor driver mode 252 (FIG. 2), without external connectors plugged to the vehicle, switches S5A and S5B operate in a series or parallel mode. In related embodiments, switch S10, which may be implemented as a relay or contactor, is used to disconnect the terminal-connection cables from the center of switch S5A/B to minimize electromagnetic interference (EMI) emissions.

The groups of switches S1-S4, and S6-S9 are each operated as H-bridge circuits to alternate current through their respective motor winding, Lc1 and Lc2. This operation is coordinated with corresponding circuitry of the other phase(s) to effect speed and direction control of the electric machine as a motor. Likewise, the groups of switches may be operated to transfer power to the energy storage device during regenerative braking when the electric machine is acting as a generator and the windings are sourcing AC current.

In battery charging mode 254 and supply mode 256, the electric machine is generally stationary, and windings Lc1 and Lc2 are used in circuit as inductors. A variety of circuit topologies or switching sequences may be utilized, as needed, to achieve the desired voltage-conversion or inversion functionality. For example, they can be divided into 2 groups of input voltage: AC and DC source or load. Different configurations are achieved by changing switch states.

Figure 4B:
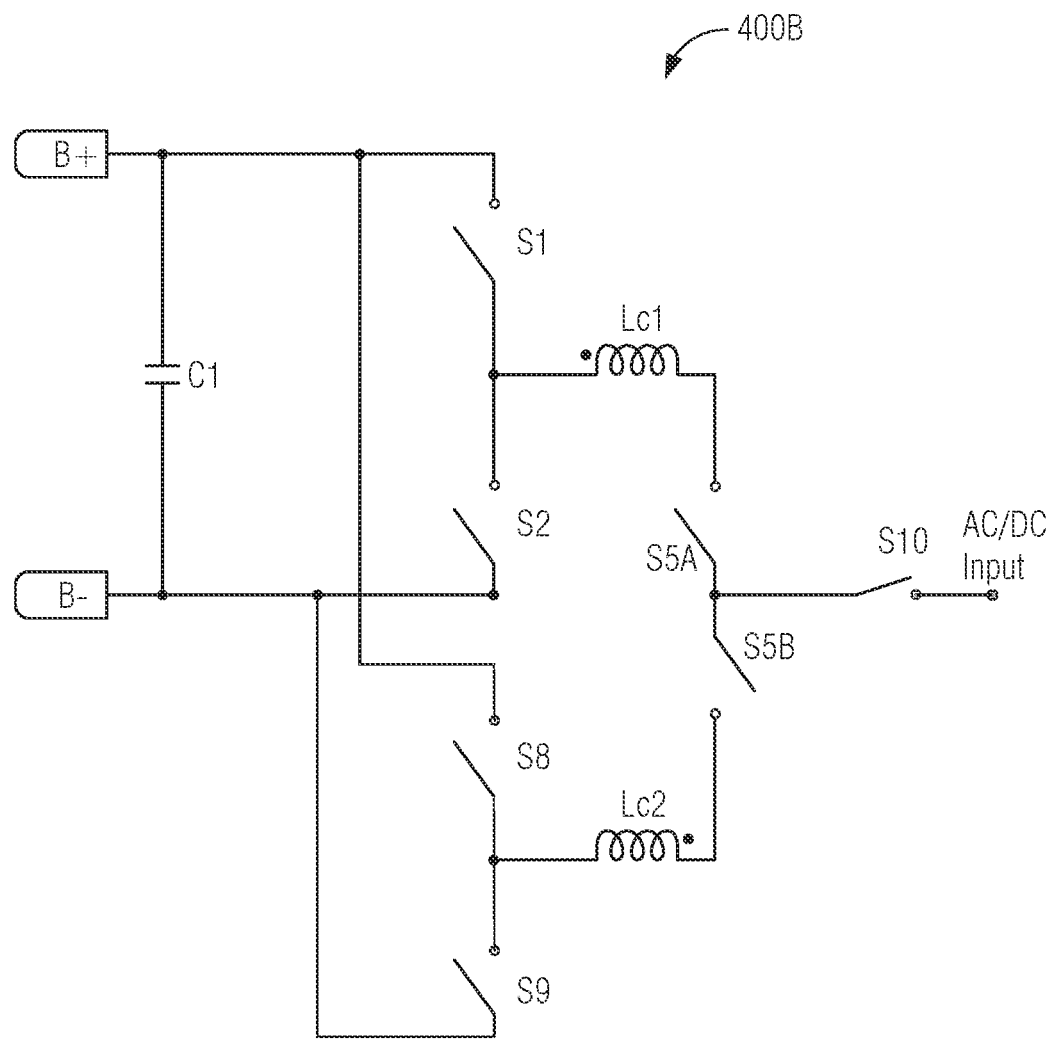
FIG. 4B is a circuit diagram illustrating a particular configuration of the switching circuitry of FIG. 4A that may be used with AC configurations such as single phase, split phase, and 3-phase AC grid voltage or load, according to some embodiments.

In the case of AC configurations such as single phase, split phase, and 3-phase AC grid voltage or load, switching circuitry 400B, which is a configuration of switching circuitry 400A, may be realized as illustrated in FIG. 4B, with switches S5A and S5B closed. In this example, current is shared between parallel branches through windings Lc1 and Lc2 by controlling switches S1, S2, S8 and S9. Different modes of operation are obtained by changing power flow direction, e.g., in charging mode 254, power is controlled from the AC grid to the energy storage device while the opposite power flow direction is used for supply mode 256.

Referring again to FIG. 5, when using DC supply 122, such as a solar PV, the positive DC supply terminal can be connected to L1, L2 or L3 while the negative terminal is connected to B−. It may result in 3 independent DC/DC converters with buck, boost or buck-boost configurations.

In another configuration, the DC supply can be connected between two of the three inputs, lines L1, L2, L3. In this case (referring to FIG. 4A) switches S4, S7 and S5 of one input are closed and all other switches are open. If, for example, line L2 (FIG. 5) has its switches configured in this way, it connects input L2 to B−, providing two channels of DC/DC conversion. Line L2 in this case is used as a common negative terminal, whereas lines L1 and L3 become the two positive terminals.

Figure 4C:
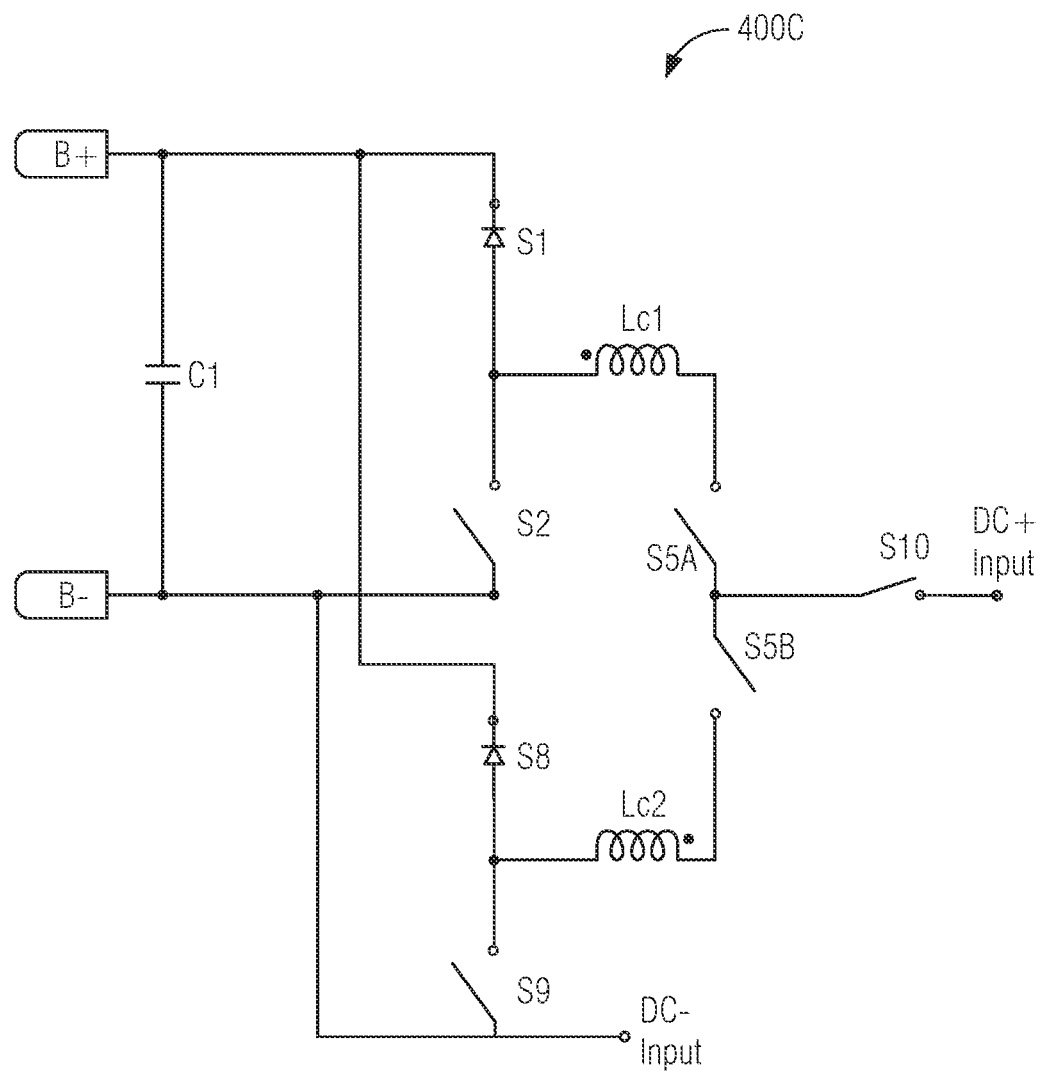
FIG. 4C is a circuit diagram illustrating the switching circuitry of FIG. 4A in a configuration that implements a boost converter according to another example.

FIG. 4C is a circuit diagram illustrating switching circuitry 4000, which is a configuration of circuit arrangement 400A that implements a boost converter according to another example. Here, switches S5A and S5B are on, switches S1 and S8 are off, only power-transistor body diodes (which are intrinsic to power MOSFETS, for example) are used while switches S2 and S9 are controlled with regulated duty cycles to achieve the desired voltage conversation ratio with the energy storage voltage level (B+/B−).

Figure 4D:
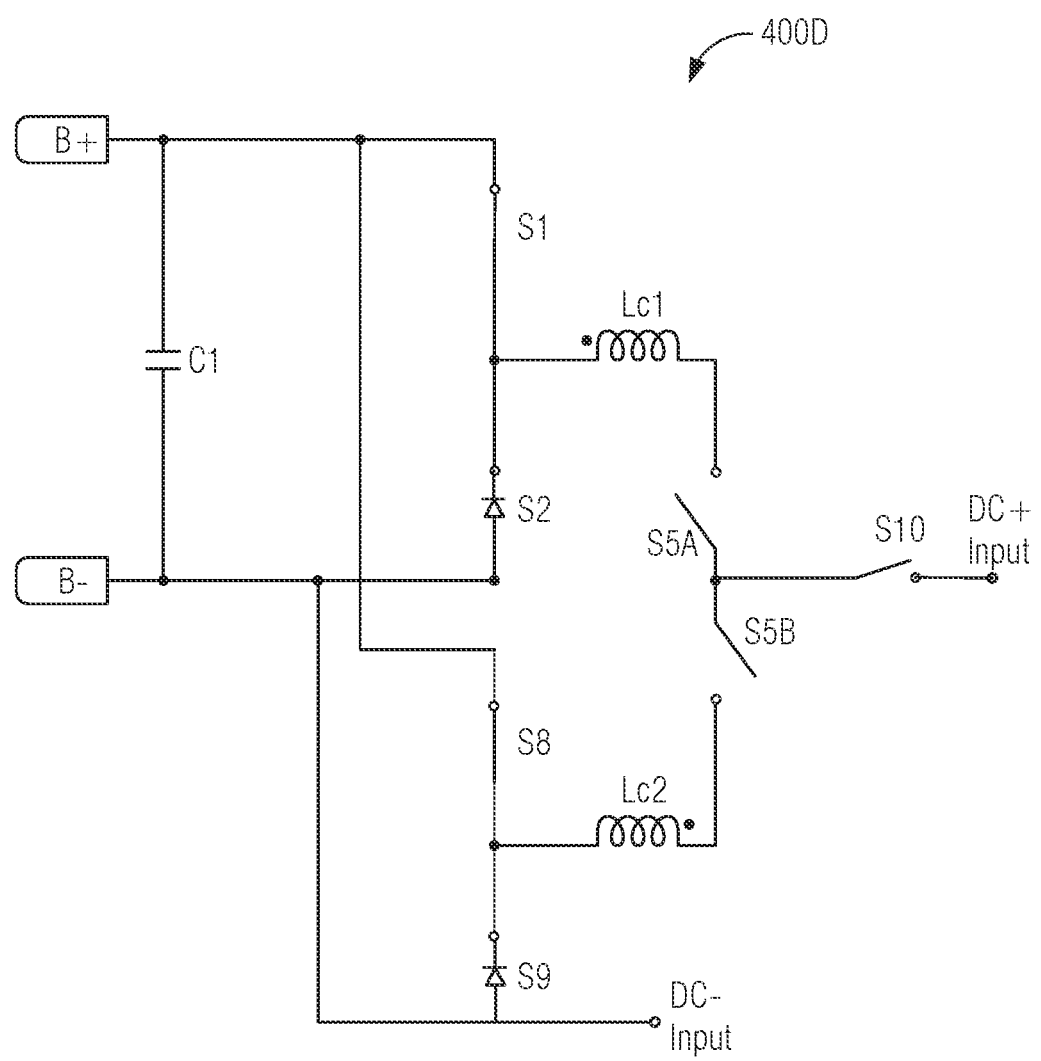
FIG. 4D is a circuit diagram illustrating the switching circuitry of FIG. 4A in a configuration that implements a buck converter according to another example.

FIG. 4D is a circuit diagram illustrating circuit arrangement 400D as a configuration of circuit arrangement 400A that implements a buck converter. Accordingly, switches S3 and S6 are open, and not shown. Switches S1 and S8 are on while S2 and S9 are off (e.g., in MOSFET implementations, using their reversed body diode for current freewheeling). Switches S5A and S5B are controlled with regulated duty cycle to obtain desired voltage conversion ratio(s).

Figure 4E:
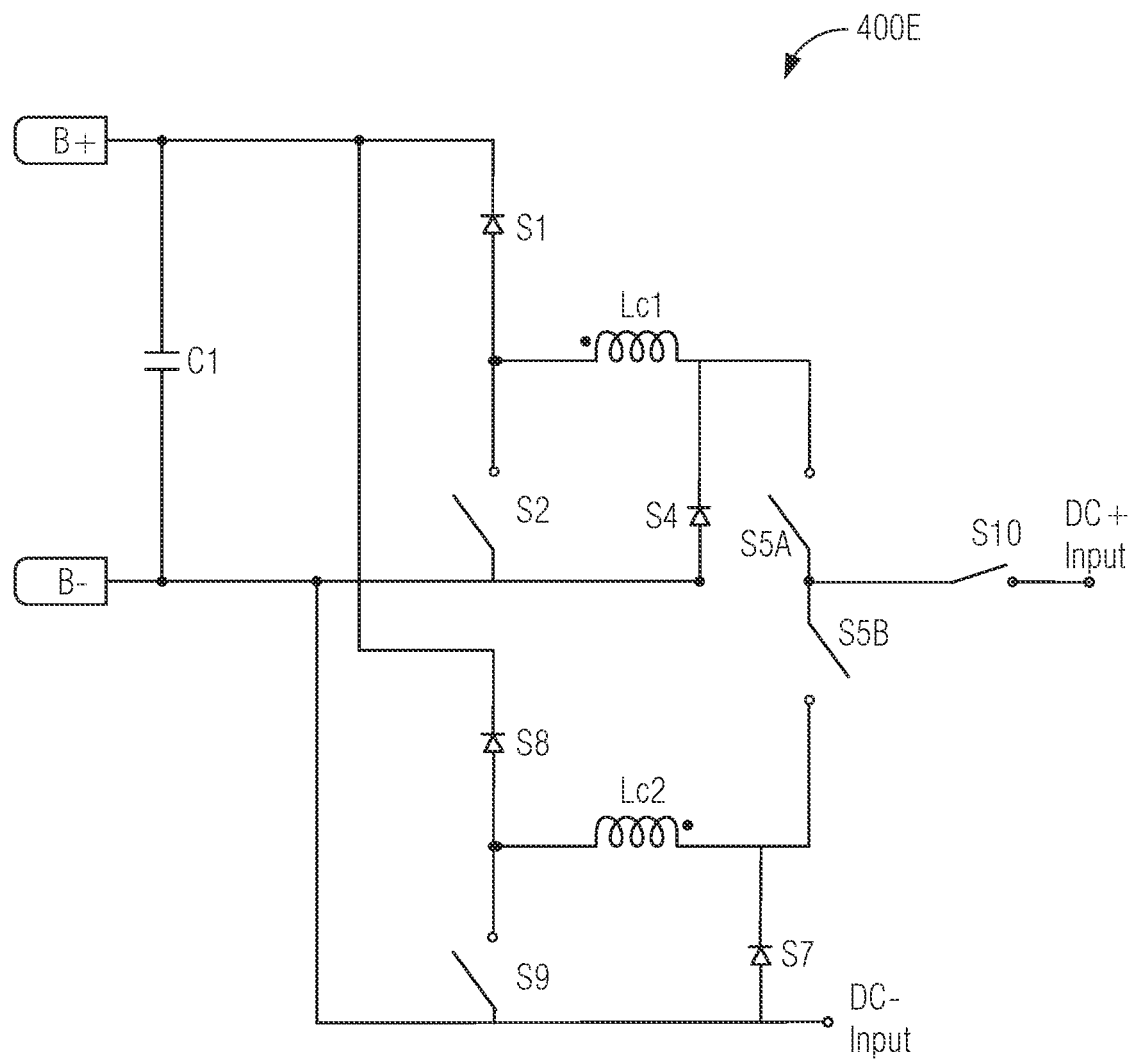
FIG. 4E is a circuit diagram illustrating the switching circuitry of FIG. 4A in a configuration that implements a non-inverting buck-boost converter according to another example.

FIG. 4E is a circuit diagram illustrating circuit arrangement 400E as a configuration of circuit arrangement 400A that implements a non-inverting buck-boost converter as another example. In this operational example, switches S3 and S6 are open and not shown, while switches S1, S4, S7 and S8 are off (using their reversed body diodes in MOSFET implementations). Switches S5A and S2 turn on at the same time to store energy on inductor Lc1, which is released to the energy storage device (on B+/B−) in their off period. Boost mode is operated with duty cycle of switches S5A and S2 higher than 50%, while buck mode is used otherwise. A similar operation is conducted using switches S5B and S9.

In related embodiments, where appropriate, the parallel current paths through Lc1 and Lc2 may be controlled in interleaving fashion to reduce current ripple on the DC output current.

Additionally or alternatively, the negative terminal of DC supply input may be connected to the OUTPUT node of the other phase, i.e. DC− as shown in FIG. 4A. In this case, the switching patterns of parallel phases either in DC or AC configuration may be correlatively controlled.

In a related embodiment, in these circuit configurations for the battery charging mode 254, or supply mode 256, the pair of inductors Lc1, Lc2 of the same phase of the electric machine are connected and energized in opposite polarities. Advantageously, this arrangement allows the magnetic effect of the current in each winding Lc1, Lc2 on the machine's rotor to be cancelled out by the current in the other winding Lc2, Lc1, thereby mitigating any undesired torsional vibration of the rotor shaft of the electric machine.

Figure 6:
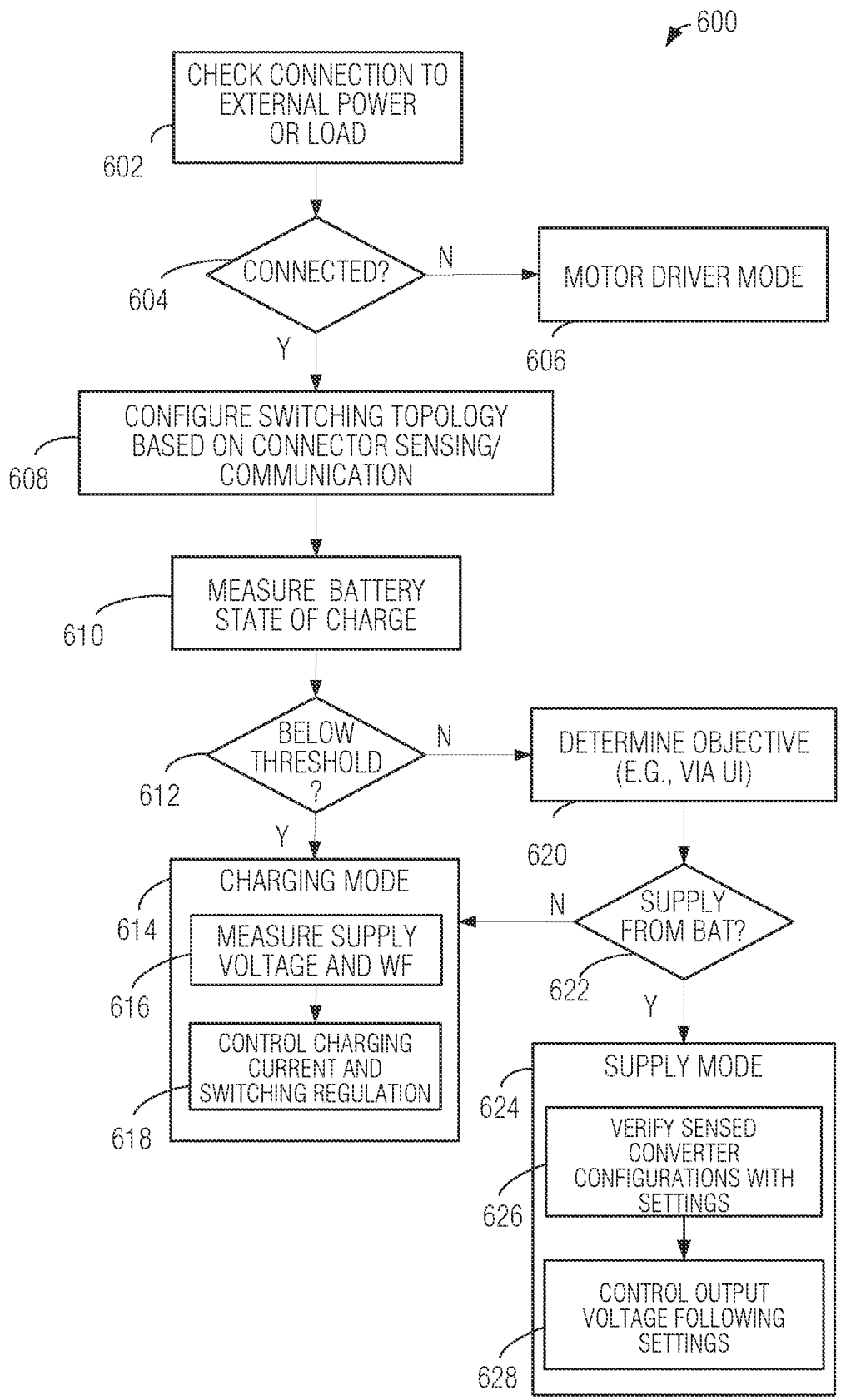
FIG. 6 is a flow diagram illustrating a controller program that is executable by a system controller according to some embodiments.

FIG. 6 is a flow diagram illustrating a controller program 600 that is executable by a system controller, such as controller 104 (FIG. 1) or controller 310 (FIG. 3), according to some embodiments, and includes an example of a process for selecting the operating mode of a dynamically-reconfigurable multi-modal power converter system, such as system 100 (FIG. 1), system 250 (FIG. 2), or system 300 (FIG. 3).

At 602, the controller reads electrical measurements, such as voltage or current probes or GPIO, to check whether the system is connected to an external power supply, such as an AC or DC supply, or to an external load. If, at decision 604, the controller determines that no such connection exists, the system defaults to motor driver mode at 606. As described above, motor driver mode, such as mode 252, uses the switching circuitry to transfer power from an on-board power storage device to run an electric machine. The switching circuitry may implement a variable-DC-voltage drive for powering a DC motor, or a variable-frequency drive for powering an AC motor, such as an induction motor, synchronous motor, or brushless DC motor. In a more basic application, the switching circuitry may implement a fixed-voltage, fixed frequency power supply.

If decision 604 does not recognize a connection to an external power source or load, the process advances to operation 608, which configures the switching circuitry topology based on the used connectors and sensed voltage. For example, if the 3 phase AC connector is used, the switching circuitry may be configured at 3 phase inverter; or, if the DC connector is used, the switching circuitry will be configured for buck or boost configuration based on the voltage level of input DC voltage compared to the battery voltage. Similar configuring operations are employed for single phase or split phase AC input voltage. If the AC connector is plugged but no voltage is sensed, it may imply that an AC load, rather than an AC supply, is connected. Other methods of communication and sensing may be used to determine the switching circuitry configurations.

The battery state of charge is estimated to determine if there is a clear need to charge the system's battery at 610, and decision 612 compares the measured battery state of charge level to a reference threshold, such as a value corresponding to a low charge of 10% or 15%, for instance. If the measured charge of the battery is below the defined threshold, process 600 may infer that the user's intention in making the connection to an external supply was to charge the system's batter using that supply. Accordingly, decision 612 may advance the process to charging mode 614.

Charging mode 614 includes measuring the supply voltage and waveform at 616 to determine whether the supply is an AC or DC supply and, in case of an AC supply, the line frequency and, if active rectification is to be executed by the switching circuitry, the phase of the AC supply. The switching converter is operated at 618. Additional operations include rectification of AC power, and feedback control to ensure a DC charging current at the appropriate voltage for charging the battery. In a related embodiment, during charging, the charging current may be periodically reversed for a moment by operation of the switching circuitry to preserve the battery's electrodes by inhibiting undesired crystallization of the electrodes.

If, at decision 612, the measured battery state of charge is not below the defined threshold, the process branches to operation 620, in which the controller determines the user's objectives. With the connected power or load, the user may intend to either charge the battery using the externally-supplied power, or use the stored energy in the battery to supply power to a connected load or supply power to the power grid or power bus. Accordingly, operation 620 may prompt the user, or simply wait for the user's provided input, to indicate the intended mode of operation via a UI. As discussed above, the UI may be implemented in a variety of ways, including through a dedicated local hardware device, or by communications with a user's computing device via wireless networking over a local network or via a cloud-based service, for example.

At decision 622, if the user intends to use the system's battery as a power source for the connected power grid, power bus, or load, the process advances to implement supply mode 624. Supply mode 624 includes verification of the user configuration versus the sensed signals 626. If they are matched, the process advances, otherwise, there a warning notification is issued. At operation 628, the voltage and waveform, if applicable, at the load (which may be an AC grid or DC supply bus to which power is to be transferred) are measured.

At 628, the configured power converter is implemented and operated using the switching circuitry and inductive windings of the motor. The switching operations may be based on the measured power waveform at the AC grid to which power is to be supplied so that the generated AC waveform coincides in phase with the AC wave of the power grid. To this end, a PLL subroutine may be executed by the controller to maintain synchronization. In case power is being supplied to a DC bus, the inversion operation is omitted. The voltage is regulated, such as by a PWM technique, or boosting technique, as appropriate, supply power at a desired amount. Accordingly, electrical measurement (voltage or current at the output), and feedback control to maintain the appropriate voltage or current supply, may be carried out by the controller.

This additional functionality from the motor and inductive-winding switching combination provides a number of possible benefits. In an EV embodiment, for instance, the need for an on board Lc1/2 charger, which is typical in most electric vehicles, is obviated. These are generally 120/240V single phase input chargers delivering 1.7-5 kw charging power. Using the switching circuitry already available as part of the motor drive circuitry to control the charging of the EV's battery, users can plug the vehicle into any standard AC receptacle to charge their electric vehicle. Such can, for example, eliminate the expensive DC charging infrastructure typically employed for most electric vehicles. Charging vehicles equipped with the motor drive circuitry described herein may only require a standard AC connection, e.g., typical industrial 208 V, 200 A, 3-phase service would provide about 70 kW of charging power. This greatly simplifies fleet charging for commercial applications, since only standard AC power is needed, eliminating the need for expensive DC fast chargers.

Additionally or alternatively, electric vehicles can become backup power or site power storage devices, depending on the particular application, especially when used in conjunction a primary energy source such as fuel cells, etc. Users can use vehicle fleets as grid energy storage to provide additional revenue streams by providing peak power when the electric vehicles are not in transit or operation as a vehicle.

Additionally or alternatively, the electric machine (e.g., electric motor) and winding switching (i.e., motor drive) combination can advantageously provide power factor correction or line filtering functionality as the angle and shape of current draw in both single-phase mode and 3-phase mode can be completely controlled. During charging or discharging the power factor can be controlled to any non-zero value, typically a desired power factor is PF=1.

While the described technology may be applied to many electric machine designs, in at least one implementation of the technology into a Permanent Magnet Synchronous Machine (PMSM) using a Field Oriented Control topology with a phase locked loop based on input from a set of AC voltage measurements.

Additionally or alternatively, the electric machine (e.g., electric motor) and switching (i.e., motor drive) combination can also receive DC power, for example, from PV systems. In such implementations, can additionally or alternatively, vary the power draw from PV systems to implement maximum power point tracking (MPPT) capability to provide maximum efficiency operation of the PV system.

Additional Notes and Examples

Example 1 is a dynamically-reconfigurable power converter, comprising: a controller circuit; switching circuitry comprising plurality of switches operatively coupled to the controller circuit, the switching circuitry further comprising: a first set of nodes electrically connectable to terminals of an energy storage device; a second set of nodes electrically connectable to at least one winding of a rotational electric machine; and a third set of nodes electrically connectable to an external power source; electrical measurement circuitry operatively coupled to the controller circuit and arranged to monitor electrical conditions at the first set of nodes and the third set of nodes; wherein the plurality of switches, including a first subset of switches, are operative in a first mode, under control of the controller circuit, to regulate power delivery from the first set of nodes to the second set of nodes such that, in operation, power from the power storage device is delivered to the at least one winding of the rotational electric machine to run the rotational electric machine; and wherein the plurality of switches, including the first subset of switches, are operative in a second mode, under control of the controller circuit based on the electrical conditions at the first set of nodes and the third set of nodes, to regulate power delivery between the third set of nodes and the first set of nodes via the second set of nodes such that, in operation, power is converted and delivered between the external power source and the energy storage device through the at least one winding that is employed as an inductor.

In Example 2, the subject matter of Example 1 includes, wherein the power storage device comprises a battery.

In Example 3, the subject matter of Examples 1-2 includes, wherein the rotational electric machine comprises an AC motor and wherein the first subset of switches is operative in the first mode as part of an inverter circuit established among the switching circuitry under control of the controller circuit, wherein in operation of the first mode, the inverter circuit converts DC power from the power storage device into AC power applied to the at least one winding of the AC motor.

In Example 4, the subject matter of Examples 1-3 includes, wherein the rotational electric machine is a multi-phasic machine comprising a pair of windings for each phase, and wherein the second set of nodes is electrically connectable to each pair of windings of each phase; and wherein in operation of the second mode, the windings of each pair are energized in opposite polarities such that a net effect on mechanical movement of the rotational electric machine is nullified.

In Example 5, the subject matter of Examples 1-4 includes, wherein in operation of the second mode, power is transferred from the third set of nodes to the first set of nodes such that the external power source supplies power to charge the energy storage device.

In Example 6, the subject matter of Example 5 includes, wherein the external power source is an AC power grid, and wherein the first subset of switches is operative, under control of the controller circuit, to rectify AC power from the AC power grid to produce DC power.

In Example 7, the subject matter of Examples 1-6 includes, wherein in operation of the second mode, power is transferred from the first set of nodes to the third set of nodes such that the energy storage device supplies power to the external power source.

In Example 8, the subject matter of Example 7 includes, wherein the external power source is an AC power grid, and wherein the first subset of switches is operative, under control of the controller circuit, to invert DC power from the energy storage device into AC power to be transferred to the AC power grid.

In Example 9, the subject matter of Examples 1-8 includes, wherein in operation of the second mode, the controller circuit configures the switching circuitry, including the first subset of switches, to implement a boost converter utilizing the at least one winding of the rotational electric machine as a voltage-boosting inductor.

In Example 10, the subject matter of Examples 1-9 includes, wherein in operation of the second mode, the controller circuit configures the switching circuitry, including the first subset of switches, to implement a buck converter utilizing the at least one winding of the rotational electric machine as a filtering inductor.

In Example 11, the subject matter of Examples 1-10 includes, wherein in operation of the first mode, the controller circuit configures the switching circuitry, including the first subset of switches, to implement a variable-frequency motor drive to energize the at least one winding of the rotational electric machine and impart rotation of the machine.

In Example 12, the subject matter of Examples 1-11 includes, wherein: at a first instance, the controller circuit configures the switching circuitry, including the first subset of switches, to implement a motor drive, in operation of the first mode to energize the at least one winding of the rotational electric machine and impart rotation of the machine; at a second instance, the controller circuit reconfigures the switching circuitry, including the first subset of switches, to implement a boost converter utilizing the at least one winding of the rotational electric machine as a voltage-boosting inductor in operation of the second mode to convert voltage and transfer power between the external power source and the energy storage device.

In Example 13, the subject matter of Examples 1-12 includes, wherein: at a first instance, the controller circuit configures the switching circuitry, including the first subset of switches, to implement a motor drive, in operation of the first mode to energize the at least one winding of the rotational electric machine and impart rotation of the machine; at a second instance, the controller circuit reconfigures the switching circuitry, including the first subset of switches, to implement a buck converter utilizing the at least one winding of the rotational electric machine as a filtering inductor in operation of the second mode to convert voltage and transfer power between the external power source and the energy storage device.

In Example 14, the subject matter of Examples 1-13 includes, wherein: at a first instance, the controller circuit configures the switching circuitry, including the first subset of switches, to implement a motor drive, in operation of the first mode, to energize the at least one winding of the rotational electric machine and impart rotation of the machine; at a second instance, the controller circuit reconfigures the switching circuitry, including the first subset of switches, to implement an inverter and voltage converter utilizing the at least one winding of the rotational electric machine as either a voltage-boosting inductor or a filtering inductor, in operation of the second mode, to convert voltage and transfer power between the external power source and the energy storage device.

In Example 15, the subject matter of Examples 1-14 includes, wherein the rotational electric machine is a traction motor of an electric vehicle and wherein the energy storage device is a traction battery of the electric vehicle.

In Example 16, the subject matter of Example 15 includes, wherein the external power source is an AC power grid.

In Example 17, the subject matter of Examples 1-16 includes, wherein the switching circuitry is a first instance of switching circuitry electrically coupled with the first set of at least one winding which correspond to a first phase of the rotational electric machine; and wherein the dynamically-reconfigurable power converter further comprises: a second instance of the switching circuitry electrically coupled with a second set of at least one winding which correspond to a second phase of the rotational electric machine; and a third instance of the switching circuitry electrically coupled with a third set of at least one winding which correspond to a third phase of the rotational electric machine; wherein the first instance of the switching circuitry is electrically coupled to a first electric terminal, the second instance of the switching circuitry is electrically coupled to a second electric terminal, and the third instance of the switching circuitry is electrically coupled to a third electric terminal.

In Example 18, the subject matter of Example 17 includes, wherein the first, second, and third electric terminals are respectively coupled to a first phase, a second phase, and a third phase of a three-phase AC supply.

In Example 19, the subject matter of Examples 17-18 includes, wherein the first, second, and third electric terminals are respectively coupled to a first phase, a second phase, and a neutral line of a three-phase AC supply.

In Example 20, the subject matter of Examples 17-19 includes, wherein the first, second, and third electric terminals are respectively coupled to an AC supply line of an AC power supply, a positive DC supply line of a DC power supply, and a negative DC supply line of the DC power supply that tied to a neutral line of the AC power supply.

Example 21 is a method for electrically configuring an electric vehicle (EV) in various modes, the method comprising: configuring, by a controller of the EV, switching circuitry of the EV to operate in a motor driver mode to transfer power from a traction battery of the EV to a traction motor of the EV, wherein operation of the switching circuitry in the motor driver mode includes, activating a first subset of switches to implement an inverter that energizes windings of the traction motor with alternating current (AC) so as to impart rotation of a rotor of the traction motor; and reconfiguring, by the controller, the switching circuitry to operate in a charging mode to transfer power from an external power source to the traction battery of the EV, wherein operation of the switching circuitry in the charging mode includes activating the first subset of switches to implement a switching power converter that utilizes the windings of the traction motor as inductors, and that converts voltage of the external power source to a DC voltage of a controlled magnitude to regulate the power transfer to the traction battery, wherein pairs of the windings associated with each phase of the traction motor are energized simultaneously in opposite polarities to negate a net effect of such energization of those windings on movement of the rotor of the traction motor.

In Example 22, the subject matter of Example 21 includes, reconfiguring, by the controller, the switching circuitry to operate in a supply mode to transfer power from the traction batter to the external power source, wherein operation of the switching circuitry in the supply mode includes activating the first subset of switches to implement a switching power converter that utilizes the windings of the traction motor as inductors, and that converts DC voltage of the traction battery to an AC wave of a controlled voltage to regulate the power transfer to the external power source, wherein pairs of the windings associated with each phase of the traction motor are energized simultaneously in opposite polarities to negate a net effect of such energization of those windings on movement of the rotor of the traction motor.

In Example 23, the subject matter of Examples 21-22 includes, wherein reconfiguring the switching circuitry to operate in the supply mode includes implementing, by the controller, a phase-locked loop to track a phase of the AC wave of the external power source, and synchronizing the phase of the AC wave of the controlled voltage with the AC wave of the external power source.

In Example 24, the subject matter of Examples 21-23 includes, wherein the switching power converter includes a boost converter that uses the pairs of windings of the traction motor as switched inductors to increase voltage.

In Example 25, the subject matter of Examples 21-24 includes, wherein the switching power converter includes a buck converter that uses the pairs of windings of the traction motor as filtering inductors to store energy and stabilize voltage.

In Example 26, the subject matter of Examples 21-25 includes, wherein the external power source is an AC power grid, and wherein operation of the switching circuitry in the charging mode includes activating the first subset of switches to implement a switching power converter that utilizes the windings of the traction motor as inductors, and that converts voltage of the AC power grid to the DC voltage.

In Example 27, the subject matter of Examples 21-26 includes, wherein configuring the switching circuitry of the EV to operate in the motor driver mode includes implementing a field oriented control (FOC) scheme by the controller.

Example 28 is a system, the system comprising: a first set of alternating current (AC) nodes electrically coupleable to at least one AC source and/or AC load; a first set of direct current (DC) nodes electrically coupleable to one or more direct current (DC) storage devices; a first set of AC voltage sensors coupled to sense AC voltage inputs via the first set of AC nodes; a switching assembly comprising a plurality of switches and a plurality of nodes, the nodes electrically coupleable to each of the windings a rotational electric machine, each of the switches having at least two operational states, the switches of the switching assembly operative to selectively electrically couple windings of the rotational electric machine in at least two different configurations; and a control system communicatively coupled to the AC voltage sensors and to control operation of the switches of the switching assembly to configure one or more of the windings as inductors in alternatively in two or more power converter topologies between the first set of AC nodes and at least the first set of DC nodes and operative at least one of invert power, rectify power and/or adjust voltages.

In Example 29, the subject matter of Example 28 includes, wherein the switches of the switching assembly are operative to selectively electrically couple the windings of the rotational electric machine in at least a series combination of windings and a parallel combination of windings.

In Example 30, the subject matter of Example 29 includes, wherein the switches of the switching assembly are operative to selectively electrically couple the windings of the rotational electric machine in a first Wye configuration and a first Delta configuration, the first Wye configuration in which one set of three windings are coupled in a single Wye configuration and the first Delta configuration in which one set of three windings are coupled in a single Delta configuration.

In Example 31, the subject matter of Example 30 includes, wherein the switches of the switching assembly are operative to selectively electrically couple the windings of the rotational electric machine in a second Wye configuration and a second Delta configuration, the second Wye configuration in which one set of three pairs of windings are coupled in a single Wye configuration, the windings of each respective pair of windings being coupled in series with the other winding of the respective pair and the second Delta configuration in which one set of three pairs of windings are coupled in a single Delta configuration, the windings of each respective pair of windings being coupled in series with the other winding of the respective pair.

In Example 32, the subject matter of Examples 30-31 includes, wherein the switches of the switching assembly are operative to selectively electrically couple the windings of the rotational electric machine in a second Wye configuration and a second Delta configuration, the second Wye configuration in which one set of three subsets of windings are coupled in a single Wye configuration, the windings of each respective subset of windings being coupled in series with the other winding of the respective pair and the second Delta configuration in which one set of three subsets of windings are coupled in a single Delta configuration, the windings of each respective subsets of windings being coupled in series with the other winding of the respective pair, the number of windings in each subset being equal or greater than two.

In Example 33, the subject matter of Examples 30-32 includes, wherein the switches of the switching assembly are operative to selectively electrically couple the windings of the rotational electric machine in a parallel two Wye configuration and a parallel two Delta configuration, the parallel two Wye configuration in which two sets of three windings are each coupled in a respective Wye configuration, and the two sets Wye coupled windings are coupled in parallel to one another, and the parallel two Delta configuration in which two sets of three windings are each coupled in a respective Delta configuration, and the two sets Delta coupled windings are coupled in parallel to one another.

In Example 34, the subject matter of Examples 28-33 includes, wherein the control system controls the switches of the switching assembly to switch a configuration of the windings of the rotational electric machine via a closed transition.

In Example 35, the subject matter of Examples 28-34 includes, wherein the control system controls the switches of the switching assembly to switch a configuration of the windings of the rotational electric machine via an open transition.

In Example 36, the subject matter of Examples 28-35 includes, wherein the control system includes at least one hardware processor that executes logic.

In Example 37, the subject matter of Examples 28-36 includes, wherein the control system controls the switches of the switching assembly to switch a configuration of the windings of the rotational electric machine based at least in part on the AC voltage inputs sensed by the first set of AC voltage sensors.

In Example 38, the subject matter of Example 37 includes, wherein the control system determines whether a minimum voltage of the DC power storage device is greater than at least one input selected from: a DC input voltage from a photovoltaic array and a line-to-line peak voltage from an AC electric grid, and the switching is based at least in part on the determination.

In Example 39, the subject matter of Examples 37-38 includes, wherein the control system includes a phase locked loop (PLL) coupled to detect a frequency of the AC electric grid and to provide angles to an FOC control of a motor controller based on the detected frequency of the AC electric grid.

In Example 40, the subject matter of Examples 28-39 includes, a number of rotational electric machine sensors positioned to sense a number of operational parameters of at least the rotational electric machine, the rotational electric machine sensors communicatively coupled to the control system to provide signals thereto representative of the sensed operational parameters, wherein the control system controls operation of the switches of the switching assembly in real time based at least in part on the sensed operational parameters.

In Example 41, the subject matter of Example 40 includes, wherein the sensed operational parameters include at least one of: an output voltage; an output current; a rotational speed of a rotor of the rotational electric machine; and a relative angle of the rotor of the rotational electric machine.

In Example 42, the subject matter of Examples 28-41 includes, wherein the one or more direct current (DC) storage devices are one or more traction motor secondary batteries of one or more electric vehicles.

In Example 43, the subject matter of Examples 28-42 includes, a second set of direct current (DC) nodes electrically coupleable to one or more photovoltaic arrays, wherein the control system further controls operation of the switches of the switching assembly to configure the one or more of the windings as inductors in alternatively in two or more power converter topologies between the first set of AC nodes and at least the second sets of DC nodes.

In Example 44, the subject matter of Example 43 includes, wherein the control system is further operative to implement a maximum power point tracking algorithm with respect to power generated via the photovoltaic arrays.

In Example 45, the subject matter of Examples 28-44 includes, wherein the switches of the switching assembly comprise at least one of mechanical switches, relays, solid state switches, or a combination of mechanical switches and solid state switches.

In Example 46, the subject matter of Examples 28-45 includes, wherein the two or more power converter topologies comprise at least one of a boost power converter or buck power converter.

In Example 47, the subject matter of Examples 28-46 includes, the rotational electric machine, the rotational electric machine having a number of phases, and for each phase a respective set of a plurality of windings, the windings electrically wound in series, and wherein there is a switching path between two subsets of windings in the respective set of the plurality of windings for the phase, the switching path including at least one of the switches, operation of which selectively divides the windings wound in series into two subsets of windings wound in series, the two sets coupled in parallel.

In Example 48, the subject matter of Example 47 includes, wherein each switching path between two subsets of windings includes two or more switches, in parallel with one another.

In Example 49, the subject matter of Examples 47-48 includes, wherein there are three phases and at least one of the switches is operative to selectively switch the three phases between a Wye configuration and a Delta configuration.

In Example 50, the subject matter of Examples 47-49 includes, wherein there are three phases and at least one of the switches is operative to selectively switch the three phases between configurations other than a Wye configuration and a Delta configuration.

In Example 51, the subject matter of Examples 28-50 includes, a plurality of bridge rectifiers, the bridge rectifiers each having a pair of AC nodes on an AC side of the respective bridge rectifier and a pair of DC nodes on a DC side of the respective bridge rectifier; and the plurality of switches of the switching assembly comprises a first number of switches, each of the switches of the first number of switches on the AC side of a respective one of the bridge rectifiers, wherein each of the bridge rectifiers couple at least two windings electrically in parallel with one another when a respective switch of the first number of switches is open and the at least two windings are not subject to an open circuit condition, a low voltage condition or a short circuit condition, and each of the switches of the first number of switches is operative to selectively electrically couple the at least two windings electrically in series with one another when the switch is closed.

In Example 52, the subject matter of Example 51 includes, wherein the bridge rectifiers automatically electrically isolate a respective one of the windings of the electric machine from a parallel combination with at least one other one of the windings of the electric machine when the respective one of the windings experiences either a short circuit condition, a low voltage condition or an open-circuit condition.

In Example 53, the subject matter of Example 52 includes, wherein the bridge rectifiers automatically electrically couple the respective one of the windings of the electric machine in series with at least one other one of the windings of the electric machine when the respective one of the windings experiences either the short circuit condition, the low voltage condition or the open-circuit condition.

In Example 54, the subject matter of Examples 52-53 includes, wherein the first number of switches are semiconductor based switches.

In Example 55, the subject matter of Example 54 includes, wherein the first number of switches are TRIACS.

In Example 56, the subject matter of Examples 54-55 includes, wherein: the control system is operative a controller configured to switch the triacs at a respective zero crossings of a respective current.

In Example 57, the subject matter of Examples 54-56 includes, wherein there is one semiconductor based switch for each of the windings of the electric machine, and the plurality of switches of the switching assembly further comprise: a second number of switches, each of the switches of the second number of switches operative to selectively couple the at least two windings between being electrically in parallel with one another when the switch is open and electrically in series with one another when the switch is closed, the switches of the second number of switches on the AC side of the respective bridge rectifier and electrically in parallel with respective ones of the first number of switches, wherein the switches of the first number of switches are faster acting than the switches of the second number of switches and the switches of the second number of switches have a lower associated electrical loss than an electrical loss associated with the switches of the first number of switches.

In Example 58, the subject matter of Example 57 includes, wherein the second number of switches are mechanical switches.

In Example 59, the subject matter of Example 58 includes, wherein there is one mechanical switch for each of the windings of the electric machine.

In Example 60, the subject matter of Examples 54-59 includes, wherein the first number of switches are mechanical switches, and there is one mechanical switch for each of the windings of the electric machine.

In Example 61, the subject matter of Examples 54-60 includes, wherein all of the bridge rectifiers of the plurality of bridge rectifiers are coupled to a common heat sink.

In Example 62, the subject matter of Examples 54-61 includes, a power factor correction circuit applying a power factor correction at a DC output of the variable winding configuration system.

In Example 63, the subject matter of Examples 54-62 includes, wherein a number of active switches are selectively operative to reverse a current flow from a DC bus to the windings to operate the electric machine as a motor.

In Example 64, the subject matter of Examples 54-63 includes, an additional bridge rectifier coupled to an end of a string formed by the bridge rectifiers of the first number of bridge rectifiers to couple the variable winding configuration electrically in parallel with a second variable winding configuration system; at least one additional switch operative to selectively couple the variable winding configuration electrically in series with the second variable winding configuration system; and a coupler configured to detachably electrically couple the second variable winding configuration system to the variable winding configuration system.

In Example 65, the subject matter of Examples 54-64 includes, wherein there is at least one bridge rectifier for each pair of windings of an electric machine.

Example 66 is at least one machine-readable medium including instructions that, when executed by processing circuitry, cause the processing circuitry to perform operations to implement of any of Examples 1-65.

Example 67 is an apparatus comprising means to implement of any of Examples 1-65.

Example 68 is a method to implement of any of Examples 1-65.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to control systems for electric machines, not necessarily the exemplary systems, methods, and apparatus generally described above.

The various embodiments described above can be combined to provide further embodiments. All of the US patents, US patent application publications, US patent applications, foreign patents, foreign patent applications and non-patent publications referred to in this specification and/or listed in the Application Data Sheet, including but not limited to U.S. patent application Ser. No. 13/393,749, filed May 15, 2012; U.S. Pat. No. 7,081,696; U.S. Patent Application Publication No. 2008088200; U.S. Provisional Patent Application No. 60/094,007, filed Sep. 3, 2008, U.S. Provisional Patent Application Ser. No. 61/239,769, filed Sep. 3, 2009; U.S. patent publication No. 2012-0229060; U.S. patent publication No. 2011-0241630; U.S. Pat. No. 8,106,563; U.S. patent publication No. 2010-0090553; U.S. patent publication No. 2014-0252922; International patent application PCT/CA2018/050222 (published as WO 2018/213919); International patent application PCT/CA2019/051238 (published as WO 2020/047663); and U.S. patent application Ser. No. 13/842,213, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 114(f), are not to be invoked unless the specific terms "means for" or "step for" are recited in a claim.

The invention claimed is:

1. A dynamically-reconfigurable power converter, comprising:
a controller circuit;
switching circuitry comprising plurality of switches operatively coupled to the controller circuit, the switching circuitry further comprising:
a first set of nodes electrically connectable to terminals of an energy storage device;
a second set of nodes electrically connectable to at least one winding of a rotational electric machine;
a third set of nodes electrically connectable to an external power source; and
electrical measurement circuitry operatively coupled to the controller circuit and arranged to monitor electrical conditions at the first set of nodes and the third set of nodes;
wherein the plurality of switches, including a first subset of switches, are operative in a first mode, under control of the controller circuit, to regulate power delivery from the first set of nodes to the second set of nodes such that, in operation, power from the power storage device is delivered to the at least one winding of the rotational electric machine to run the rotational electric machine; and
wherein the plurality of switches, including the first subset of switches, are operative in a second mode, under control of the controller circuit based on the electrical conditions at the first set of nodes and the third set of nodes, to regulate power delivery between the third set of nodes and the first set of nodes via the second set of nodes such that, in operation, power is converted and delivered between the external power source and the energy storage device through the at least one winding that is employed as an inductor.

2. The dynamically-reconfigurable power converter of claim 1, wherein the power storage device comprises a battery.

3. The dynamically-reconfigurable power converter of claim 1, wherein the rotational electric machine comprises an AC motor and wherein the first subset of switches is operative in the first mode as part of an inverter circuit established among the switching circuitry under control of the controller circuit, wherein in operation of the first mode, the inverter circuit converts DC power from the power storage device into AC power applied to the at least one winding of the AC motor.

4. The dynamically-reconfigurable power converter of claim 1, wherein the rotational electric machine is a multi-phasic machine comprising a pair of windings for each phase, and wherein the second set of nodes is electrically connectable to each pair of windings of each phase; and
wherein in operation of the second mode, the windings of each pair are energized in opposite polarities such that a net effect on mechanical movement of the rotational electric machine is nullified.

5. The dynamically-reconfigurable power converter of claim 1, wherein in operation of the second mode, power is transferred from the third set of nodes to the first set of nodes such that the external power source supplies power to charge the energy storage device.

6. The dynamically-reconfigurable power converter of claim 5, wherein the external power source is an AC power grid, and wherein the first subset of switches is operative, under control of the controller circuit, to rectify AC power from the AC power grid to produce DC power.

7. The dynamically-reconfigurable power converter of claim 1, wherein in operation of the second mode, power is transferred from the first set of nodes to the third set of nodes such that the energy storage device supplies power to the external power source.

8. The dynamically-reconfigurable power converter of claim 7, wherein the external power source is an AC power grid, and wherein the first subset of switches is operative, under control of the controller circuit, to invert DC power from the energy storage device into AC power to be transferred to the AC power grid.

9. The dynamically-reconfigurable power converter of claim 1, wherein in operation of the second mode, the controller circuit configures the switching circuitry, including the first subset of switches, to implement a boost converter utilizing the at least one winding of the rotational electric machine as a voltage-boosting inductor.

10. The dynamically-reconfigurable power converter of claim 1, wherein in operation of the second mode, the controller circuit configures the switching circuitry, including the first subset of switches, to implement a buck converter utilizing the at least one winding of the rotational electric machine as a filtering inductor.

11. The dynamically-reconfigurable power converter of claim 1, wherein in operation of the first mode, the controller circuit configures the switching circuitry, including the first subset of switches, to implement a variable-frequency motor drive to energize the at least one winding of the rotational electric machine and impart rotation of the machine.

12. The dynamically-reconfigurable power converter of claim 1, wherein:
    at a first instance, the controller circuit configures the switching circuitry, including the first subset of switches, to implement a motor drive, in operation of the first mode to energize the at least one winding of the rotational electric machine and impart rotation of the machine;
    at a second instance, the controller circuit reconfigures the switching circuitry, including the first subset of switches, to implement a boost converter utilizing the at least one winding of the rotational electric machine as a voltage-boosting inductor in operation of the second mode to convert voltage and transfer power between the external power source and the energy storage device.

13. The dynamically-reconfigurable power converter of claim 1, wherein:
    at a first instance, the controller circuit configures the switching circuitry, including the first subset of switches, to implement a motor drive, in operation of the first mode to energize the at least one winding of the rotational electric machine and impart rotation of the machine;
    at a second instance, the controller circuit reconfigures the switching circuitry, including the first subset of switches, to implement a buck converter utilizing the at least one winding of the rotational electric machine as a filtering inductor in operation of the second mode to convert voltage and transfer power between the external power source and the energy storage device.

14. The dynamically-reconfigurable power converter of claim 1, wherein:
    at a first instance, the controller circuit configures the switching circuitry, including the first subset of switches, to implement a motor drive, in operation of the first mode, to energize the at least one winding of the rotational electric machine and impart rotation of the machine;
    at a second instance, the controller circuit reconfigures the switching circuitry, including the first subset of switches, to implement an inverter and voltage converter utilizing the at least one winding of the rotational electric machine as either a voltage-boosting inductor or a filtering inductor, in operation of the second mode, to convert voltage and transfer power between the external power source and the energy storage device.

15. The dynamically-reconfigurable power converter of claim 1, wherein the rotational electric machine is a traction motor of an electric vehicle and wherein the energy storage device is a traction battery of the electric vehicle.

16. The dynamically-reconfigurable power converter of claim 15, wherein the external power source is an AC power grid.

17. The dynamically-reconfigurable power converter of claim 1, wherein the switching circuitry is a first instance of switching circuitry electrically coupled with the first set of at least one winding which correspond to a first phase of the rotational electric machine; and wherein the dynamically-reconfigurable power converter further comprises:
    a second instance of the switching circuitry electrically coupled with a second set of at least one winding which correspond to a second phase of the rotational electric machine; and
    a third instance of the switching circuitry electrically coupled with a third set of at least one winding which correspond to a third phase of the rotational electric machine;
    wherein the first instance of the switching circuitry is electrically coupled to a first electric terminal, the second instance of the switching circuitry is electrically coupled to a second electric terminal, and the third instance of the switching circuitry is electrically coupled to a third electric terminal.

18. The dynamically-reconfigurable power converter of claim 17, wherein the first, second, and third electric terminals are respectively coupled to a first phase, a second phase, and a third phase of a three-phase AC supply.

19. The dynamically-reconfigurable power converter of claim 17, wherein the first, second, and third electric terminals are respectively coupled to a first phase, a second phase, and a neutral line of a three-phase AC supply.

20. The dynamically-reconfigurable power converter of claim 17, wherein the first, second, and third electric terminals are respectively coupled to an AC supply line of an AC power supply, a positive DC supply line of a DC power supply, and a negative DC supply line of the DC power supply that tied to a neutral line of the AC power supply.

21. A method for electrically configuring an electric vehicle (EV) in various modes, the method comprising:
    configuring, by a controller of the EV, switching circuitry of the EV to operate in a motor driver mode to transfer power from a traction battery of the EV to a traction motor of the EV, wherein operation of the switching circuitry in the motor driver mode includes activating a first subset of switches to implement an inverter that energizes windings of the traction motor with alternating current (AC) so as to impart rotation of a rotor of the traction motor; and
    reconfiguring, by the controller, the switching circuitry to operate in a charging mode to transfer power from an external power source to the traction battery of the EV, wherein operation of the switching circuitry in the charging mode includes activating the first subset of switches to implement a switching power converter that utilizes the windings of the traction motor as inductors, and that converts voltage of the external power source to a DC voltage of a controlled magnitude to regulate the power transfer to the traction battery, wherein pairs of the windings associated with each phase of the traction motor are energized simultaneously in opposite polarities to negate a net effect of such energization of those windings on movement of the rotor of the traction motor.

22. The method of claim 21, further comprising:
    reconfiguring, by the controller, the switching circuitry to operate in a supply mode to transfer power from the traction batter to the external power source, wherein operation of the switching circuitry in the supply mode includes activating the first subset of switches to implement a switching power converter that utilizes the windings of the traction motor as inductors, and that converts DC voltage of the traction battery to an AC wave of a controlled voltage to regulate the power transfer to the external power source, wherein pairs of the windings associated with each phase of the traction motor are energized simultaneously in opposite polarities to negate a net effect of such energization of those windings on movement of the rotor of the traction motor.

23. The method of claim 21, wherein reconfiguring the switching circuitry to operate in the supply mode includes implementing, by the controller, a phase-locked loop to track a phase of the AC wave of the external power source, and synchronizing the phase of the AC wave of the controlled voltage with the AC wave of the external power source.

24. The method of claim 21, wherein the switching power converter includes a boost converter that uses the pairs of windings of the traction motor as switched inductors to increase voltage.

25. The method of claim 21, wherein the switching power converter includes a buck converter that uses the pairs of windings of the traction motor as filtering inductors to store energy and stabilize voltage.

26. The method of claim 21, wherein the external power source is an AC power grid, and wherein operation of the switching circuitry in the charging mode includes activating the first subset of switches to implement a switching power converter that utilizes the windings of the traction motor as inductors, and that converts voltage of the AC power grid to the DC voltage.

27. The method of claim 21, wherein configuring the switching circuitry of the EV to operate in the motor driver mode includes implementing a field oriented control (FOC) scheme by the controller.

\* \* \* \* \*